United States Patent
Geng et al.

(10) Patent No.: US 12,538,202 B2
(45) Date of Patent: Jan. 27, 2026

(54) CELL HANDOVER METHOD AND APPARATUS

(71) Applicant: HUAWEI TECHNOLOGIES CO., LTD., Guangdong (CN)

(72) Inventors: Tingting Geng, Shenzhen (CN); Yu Zeng, Shanghai (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 232 days.

(21) Appl. No.: 18/461,492

(22) Filed: Sep. 5, 2023

(65) Prior Publication Data
US 2023/0422124 A1     Dec. 28, 2023

Related U.S. Application Data

(63) Continuation of application No. PCT/CN2022/081498, filed on Mar. 17, 2022.

(30) Foreign Application Priority Data

Apr. 2, 2021 (CN) .......................... 202110361698.X

(51) Int. Cl.
H04W 36/24 (2009.01)
H04W 36/00 (2009.01)
H04W 36/08 (2009.01)

(52) U.S. Cl.
CPC ..... *H04W 36/249* (2023.05); *H04W 36/0064* (2023.05); *H04W 36/0072* (2013.01); *H04W 36/08* (2013.01)

(58) Field of Classification Search
CPC .......... H04W 36/249; H04W 36/0064; H04W 36/0072; H04W 36/08; H04W 36/0083
(Continued)

(56) References Cited

U.S. PATENT DOCUMENTS 8,204,196 B2 * 6/2012 O'Sullivan ........... H04M 3/565
                                                 709/204
8,892,658 B2 * 11/2014 Gupta .................. H04L 51/224
                                                 709/206
(Continued)

FOREIGN PATENT DOCUMENTS

CN        111083753 A      4/2020
CN        112020108 A      12/2020
(Continued)

OTHER PUBLICATIONS

"5G; 5GS; User Equipment (UE) conformance specification; Part 1: Protocol (3GPP TS 38.523-1 version 16.6.0. Release 16)", ETSI Technical Specification, European Telecommunications Standards Institute (ETSI), 650, Route Des Lucioles ; F-06921 Sophia-Antipolis ; France, vol. 3GPP RAN, No. V16.6.0 Feb. 2, 2021 (Feb. 2, 2021), pp. 1-2482, XP014395926.

*Primary Examiner* — Mahendra R Patel

(57) ABSTRACT

A cell handover method and an apparatus are provided. The method includes: determining an AI target cell, where the AI target cell is a predicted serving cell to which a terminal device can be handed over; and sending a first request message, where the first request message is used to request a network device corresponding to the AI target cell to allocate, to the terminal device, a resource corresponding to the AI target cell. The first request message indicates at least one of the following: identification information of the AI target cell, a type of the handover being AI handover, activation time information, expiration time information, prediction accuracy of the AI target cell, or the like. The activation time information indicates an earliest moment at which the terminal device is handed over to the AI target cell.

13 Claims, 14 Drawing Sheets

(58) Field of Classification Search
USPC .......................................................... 370/311
See application file for complete search history.

(56) References Cited

U.S. PATENT DOCUMENTS

| | | | | |
|---|---|---|---|---|
| 11,716,666 | B2* | 8/2023 | Guo ................ | H04W 36/00837 |
| | | | | 455/437 |
| 12,200,550 | B2* | 1/2025 | Liu ................... | H04W 52/0206 |
| 12,267,749 | B2* | 4/2025 | Kim ................... | H04W 36/362 |
| 2021/0121235 | A1* | 4/2021 | Wei ................... | A61B 17/07207 |
| 2022/0038975 | A1* | 2/2022 | Da Silva ........... | H04W 36/0077 |

FOREIGN PATENT DOCUMENTS

| | | | | | |
|---|---|---|---|---|---|
| CN | 114079986 | B | * | 4/2024 | ........ H04W 36/0033 |
| EP | 2131601 | A1 | * | 12/2009 | ............ H04W 76/38 |
| EP | 4354960 | A2 | * | 4/2024 | ........ H04W 36/0072 |
| EP | 4462875 | A2 | * | 11/2024 | ...... H04W 36/00837 |
| WO | 2013187813 | A1 | | 12/2013 | |
| WO | WO-2014205711 | A1 | * | 12/2014 | ............. H04L 45/16 |
| WO | WO-2020168121 | A1 | * | 8/2020 | ............ H04W 36/08 |
| WO | 2020254859 | A1 | | 12/2020 | |
| WO | WO-2020238629 | A1 | * | 12/2020 | .......... H04W 36/249 |
| WO | WO-2020242987 | A1 | * | 12/2020 | ............ H04W 36/22 |
| WO | WO-2021187936 | A1 | * | 9/2021 | ............ H04W 60/00 |
| WO | WO-2022032690 | A1 | * | 2/2022 | ............ H04W 36/08 |

* cited by examiner

CELL HANDOVER METHOD AND APPARATUS

CROSS-REFERENCE TO RELATED APPLICATIONS

This application is a continuation of International Application No. PCT/CN2022/081498, filed on Mar. 17, 2022, which claims priority to Chinese Patent Application No. 202110361698.X, filed on Apr. 2, 2021. The disclosures of the aforementioned applications are herein incorporated by reference in their entireties.

TECHNICAL FIELD

Embodiments of this application relate to the field of communication technologies, and in particular, to a cell handover method and an apparatus.

BACKGROUND

In a communication system, a terminal device may perform cell handover. For example, if signal quality of a current serving cell of the terminal device is poor, but signal quality of a neighboring cell is good, the terminal device may be handed over to the neighboring cell. Cell handover may mean that the terminal device completes, under control of a network device, migration of a radio link connection from a source cell to a target cell, and is a basic technical means for ensuring a seamless mobile communication service. How to improve efficiency of cell handover is a problem worth studying.

SUMMARY

Embodiments of this application provide a cell handover method and an apparatus. An AI target cell is predicted in an artificial intelligence AI manner, and interaction with a target base station corresponding to the AI target cell is performed in advance, so that cell handover efficiency can be improved to some extent.

According to a first aspect, a cell handover method is provided. The method may be performed by a first network device, a component (a processor, a chip, a circuit, or the like) configured in the first network device, a software module, or the like. The method includes: determining an AI target cell, where the AI target cell is a predicted serving cell to which a terminal device can be handed over; and outputting a first request message, where the first request message is used to request a second network device corresponding to the AI target cell to allocate, to the terminal device, a resource corresponding to the AI target cell, and the first request message indicates at least one of the following: identification information of the AI target cell, a type of the handover being AI handover, activation time information, expiration time information, or prediction accuracy of the AI target cell, where the activation time information indicates an earliest moment at which the terminal device is handed over to the AI target cell, and the expiration time information indicates a latest moment at which the terminal device is handed over to the AI target cell.

In the foregoing solution, an example in which the first network device is a source base station, the second network device is a target base station, and the terminal device is UE is used. Before determining a serving cell to which the UE can be handed over, the source base station predicts, in an AI manner, the serving cell to which the UE can be handed over, which is referred to as an AI target cell. The source base station sends a first request message to a base station corresponding to the AI target cell in advance, to determine whether the base station corresponding to the AI target cell accepts the request of the source base station. If the base station corresponding to the AI target cell does not accept the request of the source base station, the source base station no longer configures the cell for the UE, and performs a handover. According to the method in this embodiment of this application, the source base station may perform handover preparation with the predicted AI target cell in advance, to avoid an additional handover latency to some extent.

In a design, that the AI target cell is predicted in an AI manner includes: the AI target cell is predicted based on at least one piece of the following information, where the at least one piece of information includes: first measurement information of the terminal device, load information of a serving cell, load information of a neighboring cell, track information of the terminal device, geographical coordinate information of the terminal device, a movement direction of the terminal device, or a movement speed of the terminal device.

In a design, the method further includes: obtaining a first response message of the second network device, where the first response message is in response to the first request message, and the first response message includes indication information indicating a quantity of cells that are served by the second network device and to which the terminal device is allowed to perform AI handover.

According to the foregoing design, the first response message may include indication information indicating whether the second network device accepts the request of the first network device. For example, if the first response message indicates an ACK, it indicates that the second network device accepts the request of the first network device, or if the first response message indicates a NACK, it indicates that the second network device does not accept the request of the first network device. Further, if the first response message indicates an ACK, the first response message may further include indication information of data of a cell that is served by the second network device and to which the terminal device is allowed to perform AI handover, and the like. In this method, understandings of the first network device and the second network device can be further aligned, and a communication error probability can be reduced.

In a design, the method further includes: obtaining AI information of the second network device, where the AI information indicates at least one of the following: indication information indicating whether the second network device supports or does not support AI handover, indication information indicating an AI handover type supported by the second network device, or information about a cell that is served by the second network device and that allows AI handover.

In a design, the method further includes: transferring user plane data of the terminal device to the second network device; and outputting a first status transfer message, where the first status transfer message indicates a number of a first downlink service data unit SDU in the user plane data transferred by the first network device to the second network device, and/or a number of an SDU that can be discarded in the transferred user plane data.

According to the foregoing design, the first network device may transfer the user plane data to the second network device in advance, to reduce interruption time caused by handover.

In a design, the method further includes: determining to hand over the terminal device to a first cell in the AI target cell; and outputting a first configuration message, where the first configuration message indicates configuration information of the first cell to the terminal device.

According to this design, cell handover efficiency can be improved.

In a design, the method further includes: determining to hand over the terminal device to a second cell, where the AI target cell does not include the second cell; and outputting a second configuration message, where the second configuration message indicates configuration information of the second cell and configuration information of the AI target cell to the terminal device.

According to this design, cell handover efficiency can be improved.

In a design, the method further includes: outputting third configuration information, where the third configuration information indicates configuration information of the AI target cell and handover trigger configuration information to the terminal device, and the handover trigger configuration information indicates, to the terminal device, a trigger condition for handover to the AI target cell.

According to this design, cell handover efficiency can be improved.

In a design, the method further includes: determining to update the configuration information of the AI target cell, and/or update the handover trigger configuration information; and outputting fourth configuration information, where the fourth configuration information indicates updated configuration information of the AI target cell and/or updated handover trigger configuration information to the terminal device.

In a design, the configuration information of the AI target cell indicates at least one of the following: the identification information of the AI target cell, random access information, the activation time information, or the expiration time information, where the random access information indicates a random access resource on which the terminal device is handed over to the AI target cell, the activation time information indicates an earliest moment at which the terminal device is handed over to the AI target cell, and the expiration time information indicates a latest moment at which the terminal device is handed over to the AI target cell.

According to a second aspect, a cell handover method is provided. The method may be performed by a second network device, a component configured in the second network device, a software module, or the like. The method includes: obtaining a first request message of a first network device, where the first request message is used to request a second network device corresponding to an artificial intelligence AI target cell to allocate, to a terminal device, a resource corresponding to the AI target cell, and the first request message indicates at least one of the following: identification information of the AI target cell, a type of the handover being AI handover, activation time information, expiration time information, or prediction accuracy of the AI target cell, where the activation time information indicates an earliest moment at which the terminal device is handed over to the AI target cell, and the expiration time information indicates a latest moment at which the terminal device is handed over to the AI target cell.

In the foregoing solution, the AI technology is combined with mobility, so that a proper handover cell is inferred in advance based on AI mobility mechanism prediction, to improve a handover preparation success rate and robustness. In addition, time information of the AI target cell is introduced, so that resources of an AI target base station can be occupied as few as possible, and resource utilization is improved.

In a design, the AI target cell is predicted based on at least one piece of the following information, where the at least one piece of information includes: first measurement information of the terminal device, load information of a serving cell, load information of a neighboring cell, track information of the terminal device, geographical coordinate information of the terminal device, a movement direction of the terminal device, or a movement speed of the terminal device.

In a design, the method further includes: outputting a first response message, where the first response message is in response to the first request message, and the first response message includes indication information indicating a quantity of cells that are served by the second network device and to which the terminal device is allowed to perform AI handover.

In a design, the method further includes: outputting an AI message, where the AI information indicates at least one of the following: indication information indicating whether the second network device supports or does not support AI handover, indication information indicating an AI handover type supported by the second network device, or a quantity of cells that are served by the second network device and that allow AI handover.

In a design, the method further includes: obtaining user plane data of the terminal device transferred by the first network device; and obtaining a first status transfer message of the first network device, where the first status transfer message indicates a number of a first downlink service data unit SDU in the user plane data transferred by the first network device to the second network device, and/or a number of an SDU that can be discarded in the transferred user plane data.

According to a third aspect, a cell handover method is provided. The method may be performed by a terminal device, a component configured in the terminal device, a software module, or the like. The method includes: obtaining second configuration information of a first network device, where the second configuration information indicates configuration information of a second cell and configuration information of an artificial intelligence AI target cell to a terminal device; and performing handover to the second cell based on the configuration information of the second cell.

In a design, the method further includes: determining a first target cell when the terminal device fails to connect to the second cell.

In a design, if the terminal device side stores valid configuration information of the AI target cell, the method further includes: when the first target cell is a cell in the AI target cell, performing a handover procedure to the first target cell; or when the first target cell is not a cell in the AI target cell, performing a reestablishment procedure to the first target cell.

According to the foregoing design, signaling interaction in the handover procedure is much simpler than that in the reestablishment procedure. Therefore, in a process in which the connection between UE and the second cell fails, if the first target cell selected by the UE is a cell in the predicted AI target cell, the UE may directly initiate a handover procedure to the first target cell, to quickly restore a connection, shorten a data transmission interruption latency, and reduce signaling overheads.

In a design, if the terminal device side does not store valid configuration information of the AI target cell, the method further includes: performing a reestablishment procedure to the first target cell.

According to a fourth aspect, a cell handover method is provided. The method may be performed by a first network device, a component configured in the first network device, a software module, or the like. The method includes: outputting fifth configuration information, where the fifth configuration information indicates a trigger condition for reporting first feedback information by a terminal device; obtaining the first feedback information of the terminal device; and determining an update result of an artificial intelligence AI target cell, where the update result of the AI target cell is determined based on the first feedback information, and the update result of the AI target cell is an updated serving cell to which the terminal device can be handed over.

According to the foregoing solution, a feedback result of the terminal device is introduced, and an inference result of the AI target cell is updated, so that accuracy of an AI inference result can be ensured.

In a design, the fifth configuration information indicates at least one of the following: information and quality threshold information of at least one cell, reference location information, first distance threshold information, track change trigger information, or time reporting indication information, where the time reporting indication information includes indication information indicating that the terminal device uses the first feedback information to carry time information or does not use the first feedback information to carry time information, and the time information is a moment at which the terminal device meets the fifth configuration information, or a moment at which the terminal device reports the first feedback information.

In a design, when the fifth configuration information indicates identification information and the quality threshold information of at least one cell, the first feedback information indicates identification information of a cell that meets the fifth configuration information, and/or quality information of a cell that meets the fifth configuration information; or the first feedback information indicates identification information of a cell that does not meet the fifth configuration information, and/or quality information of a cell that does not meet the fifth configuration information; or
  when the fifth configuration information indicates the reference location information and the first distance threshold information, the first feedback information indicates latest location information of the terminal device.

According to a fifth aspect, a cell handover method is provided. The method may be performed by a terminal device, a component configured in the terminal device, a software module, or the like. The method includes: obtaining fifth configuration information of a first network device, where the fifth configuration information indicates a trigger condition for reporting first feedback information by a terminal device; and outputting the first feedback information, where the first feedback information is output when the trigger condition of the fifth configuration information is met, the first feedback information is used to update an artificial intelligence AI target cell, and an update result of the AI target cell is an updated serving cell to which the terminal device can be handed over.

According to the foregoing solution, when a condition is met, the terminal device may report feedback information to the first network device, and the first network device may update a result of the AI target cell based on feedback from the terminal device. This can ensure accuracy and validity of an AI inference result.

In a design, the fifth configuration information indicates at least one of the following: information and quality threshold information of at least one cell, reference location information, first distance threshold information, track change trigger information, or time reporting indication information, where the time reporting indication information includes indication information indicating that the terminal device uses the first feedback information to carry time information or does not use the first feedback information to carry time information, and the time information is a moment at which the terminal device meets the fifth configuration information, or a moment at which the terminal device reports the first feedback information.

In a design, when the fifth configuration information indicates identification information and the quality threshold information of at least one cell, the first feedback information indicates identification information of a cell that meets the fifth configuration information, and/or quality information of a cell that meets the fifth configuration information; or the first feedback information indicates identification information of a cell that does not meet the fifth configuration information, and/or quality information of a cell that does not meet the fifth configuration information; or
  when the fifth configuration information indicates the reference location information and the first distance threshold information, the first feedback information indicates latest location information of the terminal device.

According to a sixth aspect, an apparatus is provided. For beneficial effects, refer to the description of the first aspect. The apparatus may be a first network device, an apparatus configured in the first network device, or an apparatus that can be used in match with the first network device. In a design, the apparatus may include units that are in one-to-one correspondence with the methods/operations/steps/actions described in the first aspect. The units may be implemented by using a hardware circuit, software, or a combination of a hardware circuit and software. For example, the apparatus may include a processing unit and a communication unit, and the processing unit and the communication unit may perform corresponding functions in any design example of the first aspect. Specifically, the processing unit is configured to determine an AI target cell, where the AI target cell is a serving cell that is predicted in an AI manner and to which a terminal device can be handed over. The communication unit is configured to output a first request message, where the first request message is used to request a second network device corresponding to the AI target cell to allocate, to the terminal device, a resource corresponding to the AI target cell, and the first request message indicates at least one of the following: identification information of the AI target cell, a type of the handover being AI handover, activation time information, expiration time information, or prediction accuracy of the AI target cell, where the activation time information indicates an earliest moment at which the terminal device is handed over to the AI target cell, and the expiration time information indicates a latest moment at which the terminal device is handed over to the AI target cell. For specific execution processes of the processing unit and the communication unit, refer to the first aspect. Details are not described herein again.

According to a seventh aspect, an apparatus is provided. For beneficial effects, refer to the description of the first aspect. The apparatus includes a processor, configured to implement the method described in the first aspect. The apparatus may further include a memory, configured to store instructions and/or data. The memory is coupled to the processor. When executing the program instructions stored in the memory, the processor can implement the method described in the first aspect. The apparatus may further include a communication interface, and the communication interface is used by the apparatus to communicate with another device. For example, the communication interface may be a transceiver, a circuit, a bus, a module, a pin, or another type of communication interface, and the another device may be a second network device or a terminal device. In a possible design, the apparatus includes:

a memory, configured to store program instructions;

a processor, configured to determine an AI target cell, where the AI target cell is a serving cell that is predicted in an AI manner and to which a terminal device can be handed over; and a communication interface, configured to output a first request message, where the first request message is used to request a second network device corresponding to the AI target cell to allocate, to the terminal device, a resource corresponding to the AI target cell, and the first request message indicates at least one of the following: identification information of the AI target cell, a type of the handover being AI handover, activation time information, expiration time information, or prediction accuracy of the AI target cell, where the activation time information indicates an earliest moment at which the terminal device is handed over to the AI target cell, and the expiration time information indicates a latest moment at which the terminal device is handed over to the AI target cell. For specific execution processes of the communication interface and the processor, refer to the description of the first aspect. Details are not described again.

According to an eighth aspect, an apparatus is provided. For beneficial effects, refer to the description of the second aspect. The apparatus may be a second network device, an apparatus configured in the second network device, or an apparatus that can be used in match with the second network device. In a design, the apparatus may include units that are in one-to-one correspondence with the methods/operations/steps/actions described in the second aspect. The units may be implemented by using a hardware circuit, software, or a combination of a hardware circuit and software. For example, the apparatus may include a processing unit and a communication unit, and the processing unit and the communication unit may perform corresponding functions in any design example of the second aspect. Specifically, the communication unit is configured to obtain a first request message of a first network device, where the first request message is used to request a second network device corresponding to an artificial intelligence AI target cell to allocate, to a terminal device, a resource corresponding to the AI target cell. The first request message indicates at least one of the following: identification information of the AI target cell, a type of the handover being AI handover, activation time information, expiration time information, or prediction accuracy of the AI target cell, where the activation time information indicates an earliest moment at which the terminal device is handed over to the AI target cell, and the expiration time information indicates a latest moment at which the terminal device is handed over to the AI target cell. The processing unit is configured to process the first request message. For specific execution processes of the processing unit and the communication unit, refer to the second aspect. Details are not described herein again.

According to a ninth aspect, an apparatus is provided. For beneficial effects, refer to the description of the second aspect. The apparatus includes a processor, configured to implement the method described in the second aspect. The apparatus may further include a memory, configured to store instructions and/or data. The memory is coupled to the processor. When executing the program instructions stored in the memory, the processor can implement the method described in the second aspect. The apparatus may further include a communication interface, and the communication interface is used by the apparatus to communicate with another device. For example, the communication interface may be a transceiver, a circuit, a bus, a module, a pin, or another type of communication interface, and the another device may be a first network device or a terminal device. In a possible design, the apparatus includes:

a memory, configured to store program instructions;

a communication interface, configured to obtain a first request message of a first network device, where the first request message is used to request a second network device corresponding to an artificial intelligence AI target cell to allocate, to a terminal device, a resource corresponding to the AI target cell, and the first request message indicates at least one of the following: identification information of the AI target cell, a type of the handover being AI handover, activation time information, expiration time information, or prediction accuracy of the AI target cell, where the activation time information indicates an earliest moment at which the terminal device is handed over to the AI target cell, and the expiration time information indicates a latest moment at which the terminal device is handed over to the AI target cell; and a processor, configured to process the first request message.

For specific execution processes of the communication interface and the processor, refer to the description of the second aspect. Details are not described again.

According to a tenth aspect, an apparatus is provided. For beneficial effects, refer to the description of the third aspect. The apparatus may be a terminal device, an apparatus configured in a terminal device, or an apparatus that can be used in match with the terminal device. In a design, the apparatus may include units that are in one-to-one correspondence with the methods/operations/steps/actions described in the third aspect. The units may be implemented by using a hardware circuit, software, or a combination of a hardware circuit and software. For example, the apparatus may include a processing unit and a communication unit, and the processing unit and the communication unit may perform corresponding functions in any design example of the third aspect. Specifically, the communication unit is configured to obtain second configuration information of a first network device, where the second configuration information indicates configuration information of a second cell and configuration information of an artificial intelligence AI target cell to a terminal device. The processing unit is configured to perform handover to the second cell based on the configuration information of the second cell. For specific execution processes of the processing unit and the communication unit, refer to the third aspect. Details are not described herein again.

According to an eleventh aspect, an apparatus is provided. For beneficial effects, refer to the description of the third aspect. The apparatus includes a processor, configured to implement the method described in the third aspect. The apparatus may further include a memory, configured to store instructions and/or data. The memory is coupled to the processor. When executing the program instructions stored in the memory, the processor can implement the method described in the third aspect. The apparatus may further include a communication interface, and the communication interface is used by the apparatus to communicate with another device. For example, the communication interface may be a transceiver, a circuit, a bus, a module, a pin, or another type of communication interface, and the another device may be a first network device or a second network device. In a possible design, the apparatus includes:

a memory, configured to store program instructions;

a communication interface, configured to obtain second configuration information of a first network device, where the second configuration information indicates configuration information of a second cell and configuration information of an artificial intelligence AI target cell to a terminal device; and a processor, configured to perform handover to the second cell based on the configuration information of the second cell.

For specific execution processes of the communication interface and the processor, refer to the description of the third aspect. Details are not described again.

According to a twelfth aspect, an apparatus is provided. For beneficial effects, refer to the description of the fourth aspect. The apparatus may be a first network device, an apparatus configured in the first network device, or an apparatus that can be used in match with the first network device. In a design, the apparatus may include units that are in one-to-one correspondence with the methods/operations/steps/actions described in the fourth aspect. The units may be implemented by using a hardware circuit, software, or a combination of a hardware circuit and software. For example, the apparatus may include a processing unit and a communication unit, and the processing unit and the communication unit may perform corresponding functions in any design example of the fourth aspect. Specifically, the communication unit is configured to output fifth configuration information, where the fifth configuration information indicates a trigger condition for reporting first feedback information by a terminal device. The communication unit is further configured to obtain the first feedback information of the terminal device. The processing unit is configured to determine an update result of an artificial intelligence AI target cell, where the update result of the AI target cell is determined based on the first feedback information, and the update result of the AI target cell is an updated serving cell to which the terminal device can be handed over. For specific execution processes of the processing unit and the communication unit, refer to the fourth aspect. Details are not described herein again.

According to a thirteenth aspect, an apparatus is provided. For beneficial effects, refer to the description of the fourth aspect. The apparatus includes a processor, configured to implement the method described in the fourth aspect. The apparatus may further include a memory, configured to store instructions and/or data. The memory is coupled to the processor. When executing the program instructions stored in the memory, the processor can implement the method described in the fourth aspect. The apparatus may further include a communication interface, and the communication interface is used by the apparatus to communicate with another device. For example, the communication interface may be a transceiver, a circuit, a bus, a module, a pin, or another type of communication interface, and the another device may be a second network device or a terminal device. In a possible design, the apparatus includes:

a memory, configured to store program instructions;

a communication interface, configured to output: fifth configuration information, where the fifth configuration information indicates a trigger condition for reporting first feedback information by a terminal device, and obtain first feedback information of the terminal device; and a processor, configured to determine an update result of an artificial intelligence AI target cell, where the update result of the AI target cell is determined based on the first feedback information, and the update result of the AI target cell is an updated serving cell to which the terminal device can be handed over. For specific execution processes of the communication interface and the processor, refer to the description of the fourth aspect. Details are not described again.

According to a fourteenth aspect, an apparatus is provided. For beneficial effects, refer to the description of the fifth aspect. The apparatus may be a terminal device, an apparatus configured in a terminal device, or an apparatus that can be used in match with the terminal device. In a design, the apparatus may include units that are in one-to-one correspondence with the methods/operations/steps/actions described in the fifth aspect. The units may be implemented by using a hardware circuit, software, or a combination of a hardware circuit and software. For example, the apparatus may include a processing unit and a communication unit, and the processing unit and the communication unit may perform corresponding functions in any design example of the fifth aspect.

Specifically, the communication unit is configured to obtain fifth configuration information of a first network device, where the fifth configuration information indicates a trigger condition for reporting first feedback information by a terminal device. The processing unit is configured to determine first feedback information based on the fifth configuration information. The communication unit is further configured to output the first feedback information, where the first feedback information is output when the trigger condition of the fifth configuration information is met, the first feedback information is used to update an artificial intelligence AI target cell, and an update result of the AI target cell is an updated serving cell to which the terminal device can be handed over. For specific execution processes of the processing unit and the communication unit, refer to the fifth aspect. Details are not described herein again.

According to a fifteenth aspect, an apparatus is provided. For beneficial effects, refer to the description of the fifth aspect. The apparatus includes a processor, configured to implement the method described in the fifth aspect. The apparatus may further include a memory, configured to store instructions and/or data. The memory is coupled to the processor. When executing the program instructions stored in the memory, the processor can implement the method described in the fifth aspect. The apparatus may further include a communication interface, and the communication interface is used by the apparatus to communicate with another device. For example, the communication interface may be a transceiver, a circuit, a bus, a module, a pin, or another type of communication interface, and the another device may be a first network device or a second network device. In a possible design, the apparatus includes:

a memory, configured to store program instructions;

a communication interface, configured to obtain fifth configuration information of a first network device, where the fifth configuration information indicates a trigger condition for reporting first feedback information by a terminal device; and a processor, configured to determine first feedback information based on the fifth configuration information.

The communication interface is further configured to output the first feedback information, where the first feedback information is output when the trigger condition of the fifth configuration information is met, the first feedback information is used to update an artificial intelligence AI target cell, and an update result of the AI target cell is an updated serving cell to which the terminal device can be handed over.

For specific execution processes of the communication interface and the processor, refer to the description of the fifth aspect. Details are not described again.

According to a sixteenth aspect, an embodiment of this application further provides a computer-readable storage medium, including instructions. When the instructions are run on a computer, the computer is enabled to perform the method according to any one of the first aspect to the fifth aspect.

According to a seventeenth aspect, an embodiment of this application further provides a chip system. The chip system includes a processor, may further include a memory, and is configured to implement the method in any one of the first aspect to the fifth aspect. The chip system may include a chip, or may include a chip and another discrete component.

According to an eighteenth aspect, an embodiment of this application further provides a computer program product, including instructions. When the instructions are run on a computer, the computer is enabled to perform the method according to any one of the first aspect to the fifth aspect.

According to a nineteenth aspect, an embodiment of this application further provides a system. The system includes the apparatus in the sixth aspect or the seventh aspect and the apparatus in the eighth aspect or the ninth aspect. Optionally, the system may further include the apparatus in the tenth aspect or the eleventh aspect. Alternatively, the system includes the apparatus in the twelfth aspect or the thirteenth aspect, and the apparatus in the fourteenth aspect or the fifteenth aspect.

DESCRIPTION OF EMBODIMENTS

The following describes the technical solutions in embodiments of this application with reference to the accompanying drawings in embodiments of this application.

Figure 1:
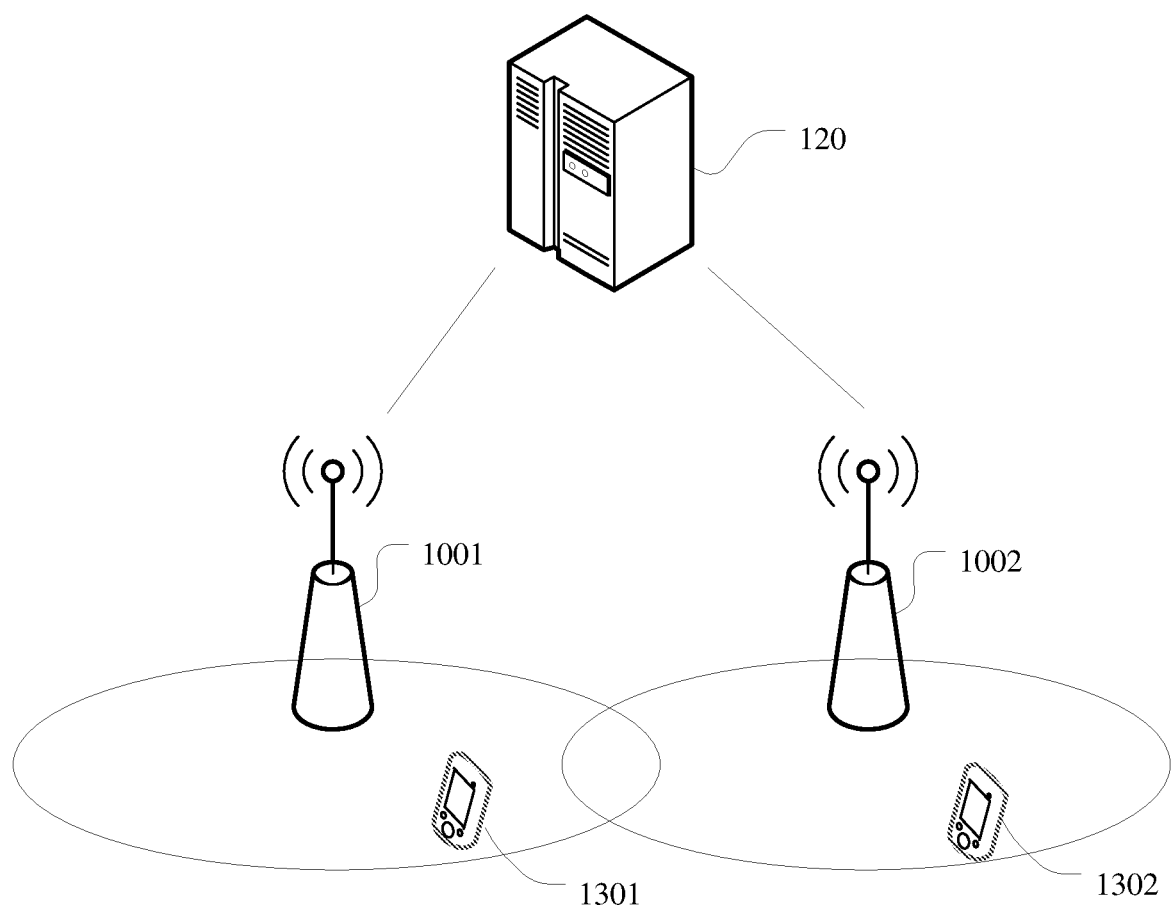
FIG. 1 is a schematic diagram of a network architecture according to an embodiment of this application.

FIG. 1 is a schematic diagram of a network architecture to which an embodiment of this application is applicable. As shown in FIG. 1, a terminal device (for example, a terminal device 1301 or a terminal device 1302) may access a wireless network, to obtain a service of an external network (for example, the internet) via the wireless network, or communicate with another device via the wireless network, for example, may communicate with another terminal device. The wireless network includes a radio access network (RAN) and a core network (CN). The RAN is configured to connect the terminal device to the wireless network, and the CN is configured to manage the terminal device and provide a gateway for communicating with the external network.

The following separately describes in detail the terminal device, the RAN, and the CN in FIG. 1.

1. Terminal Device

The terminal device may be referred to as a terminal for short, and is a device having a wireless transceiver function. The terminal device may be mobile or fixed. The terminal device may be deployed on land, where the deployment includes indoor or outdoor, or handheld or vehicle-mounted deployment, may be deployed on water (for example, on a ship), or may be deployed in air (for example, on aircraft, a balloon, or a satellite). The terminal device may be a mobile phone (mobile phone), a pad (pad), a computer with a wireless transceiver function, a virtual reality (VR) terminal device, an augmented reality (AR) terminal device, a wireless terminal device in industrial control (industrial control), a wireless terminal device in self-driving (self-driving), a wireless terminal device in remote medical (remote medical), a wireless terminal device in a smart grid (smart grid), a wireless terminal device in transportation safety (transportation safety), a wireless terminal device in a smart city (smart city), and/or a wireless terminal device in a smart home (smart home). Alternatively, the terminal device may be a cellular phone, a cordless phone, a session initiation protocol (SIP) phone, a wireless local loop (WLL) station, a personal digital assistant (PDA), a handheld device or a computing device with a wireless communication function, an in-vehicle device, a wearable device, a terminal device in the 5th generation (5G) network, a terminal device in a further evolved public land mobile network (PLMN), or the like. The terminal device may also be referred to as user equipment (UE). Optionally, the terminal device may communicate with a plurality of access network devices that use different technologies. For example, the terminal device may communicate with an access network device that supports long term evolution (LTE), or may communicate with an access network device that supports 5G, or may implement dual connectivity to an access network device that supports LTE and an access network device that supports 5G. This is not limited in embodiments of this application.

In embodiments of this application, an apparatus configured to implement a function of the terminal device may be a terminal device, or may be an apparatus that can support the terminal device in implementing the function, for example, a chip system, a hardware circuit, a software module, or a hardware circuit plus a software module. The apparatus may be installed in the terminal device or may be used in match with the terminal device. In the technical solution provided in embodiments of this application, an example in which the apparatus for implementing the function of the terminal device is a terminal device and the terminal device is UE is used to describe the technical solution provided in embodiments of this application.

2. RAN

The RAN may include one or more RAN devices, for example, a RAN device 1001 and a RAN device 1002. An interface between the RAN device and the terminal device may be a Uu interface (or referred to as an air interface). Certainly, in future communication, names of these interfaces may remain unchanged, or may be replaced by other names. This is not limited in this application.

The RAN device is a node or a device that enables the terminal device to access a radio network. The RAN device may also be referred to as a network device or a base station. The RAN device includes, for example, but is not limited to: a base station, a next generation node B (gNB) in 5G, an evolved NodeB (eNB), a radio network controller (RNC), a NodeB (NB), a base station controller (BSC), a base transceiver station (BTS), a home base station, (HNB), a baseband unit (BBU), a transmitting and receiving point (TRP), a transmitting point (TP), and/or a mobile switching center. Alternatively, the access network device may be at least one of a radio controller in a cloud radio access network (CRAN) scenario, a central unit (CU), a distributed unit (DU), a central unit control plane (CU-CP) node, a central unit user plane (CU-UP) node, integrated access and backhaul (IAB), or the like. Alternatively, the access network device may be a relay station, an access point, a vehicle-mounted device, a terminal device, a wearable device, an access network device in a future 5G network, an access network device in a future evolved public land mobile network (PLMN), or the like.

In embodiments of this application, an apparatus configured to implement a function of the access network device may be an access network device, or may be an apparatus that can support the access network device in implementing the function, for example, a chip system, a hardware circuit, a software module, or a hardware circuit and a software module. The apparatus may be installed in the access network device or may be used in match with the access network device. In embodiments of this application, the chip system may include a chip, or may include a chip and another discrete component. In the technical solutions provided in embodiments of this application, the technical solutions provided in embodiments of this application are described by using an example in which the apparatus configured to implement the functions of the access network device is the access network device and the access network device is a base station.

(1) Protocol Layer Structure

Communication between a RAN device and a terminal device complies with a specified protocol layer structure. The protocol layer structure may include a control plane protocol layer structure and a user plane protocol layer structure. For example, the control plane protocol layer structure may include functions of protocol layers such as a radio resource control (RRC) layer, a packet data convergence protocol (PDCP) layer, a radio link control (RLC) layer, a media access control (MAC) layer, and a physical layer. For example, the user plane protocol layer structure may include functions of protocol layers such as a PDCP layer, an RLC layer, a MAC layer, and a physical layer. In a possible implementation, a service data adaptation protocol (SDAP) layer may be further included above the PDCP layer.

Figure 2A:
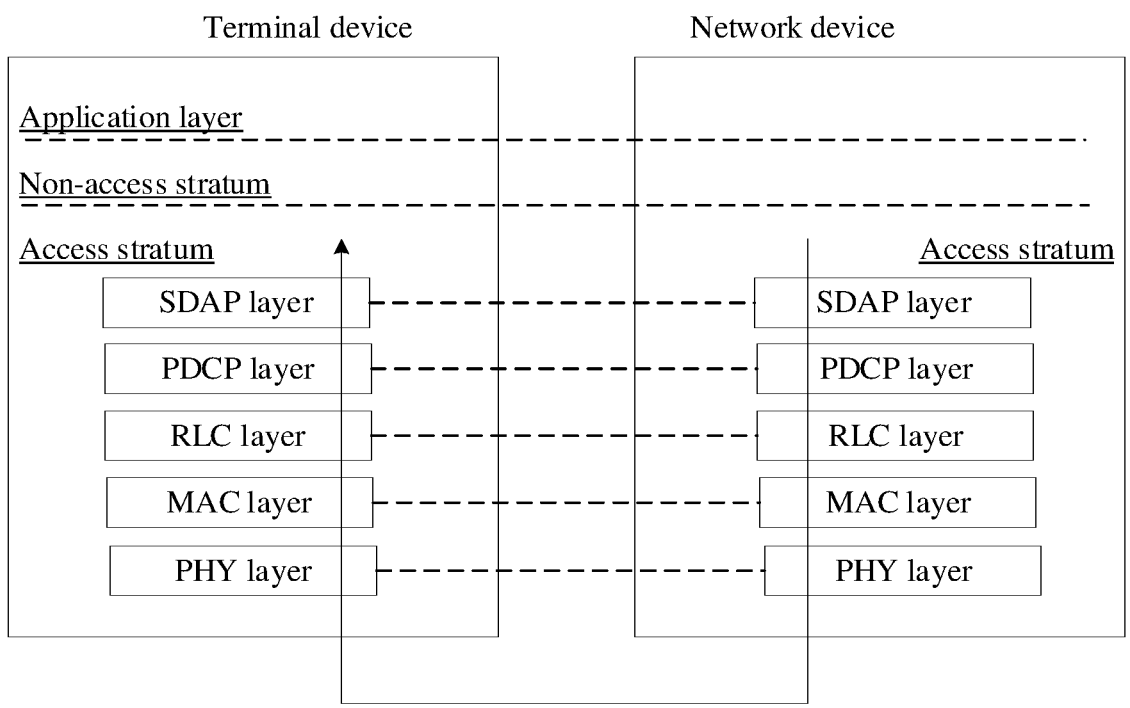
FIG. 2a, FIG. 2b, FIG. 2c, and FIG. 2d are schematic diagrams of a protocol stack according to an embodiment of this application.

Data transmission between a network device and a terminal device is used as an example. Data transmission needs to pass through the user plane protocol layer, for example, the SDAP layer, the PDCP layer, the RLC layer, the MAC layer, and the physical layer. The SDAP layer, the PDCP layer, the RLC layer, the MAC layer, and the physical layer may also be collectively referred to as an access stratum. Because a data transmission direction includes sending or receiving, each layer is further divided into a sending part and a receiving part. Downlink data transmission is used as an example. FIG. 2*a* schematic diagram of downlink data transmission between layers. In FIG. 2*a*, a downward arrow represents data sending, and an upward arrow represents data receiving. After obtaining data from an upper layer, the PDCP layer transmits the data to the RLC layer and the MAC layer, the MAC layer generates a transport block, and then wireless transmission is performed through the physical layer. Data is encapsulated at each layer. For example, data received by a layer from an upper layer of the layer is considered as a service data unit (SDU) of the layer, encapsulated by the layer into a protocol data unit (PDU), and then transferred to a next layer.

For example, it can be further learned from FIG. 2*a* that, the terminal device further has an application layer and a non-access stratum. The application layer may be used to provide a service for an application installed on the terminal device. For example, downlink data received by the terminal device may be sequentially transmitted from the physical layer to the application layer, and then is provided by the application layer for the application. For another example, the application layer may obtain data generated by the application, sequentially transmit the data to the physical layer, and send the data to another communication apparatus. The non-access stratum may be configured to forward user data. For example, the non-access stratum forwards uplink data received from the application layer to the SDAP layer, or forwards downlink data received from the SDAP layer to the application layer.

(2) Central Unit (CU) and Distributed Unit (DU)

Figure 2B:
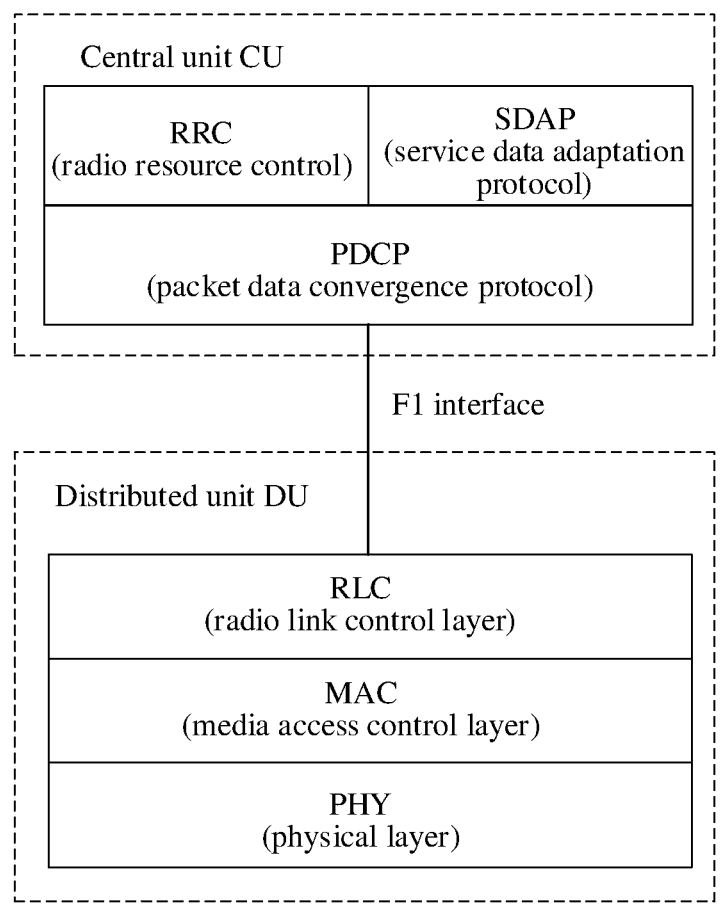
Figure 2C:
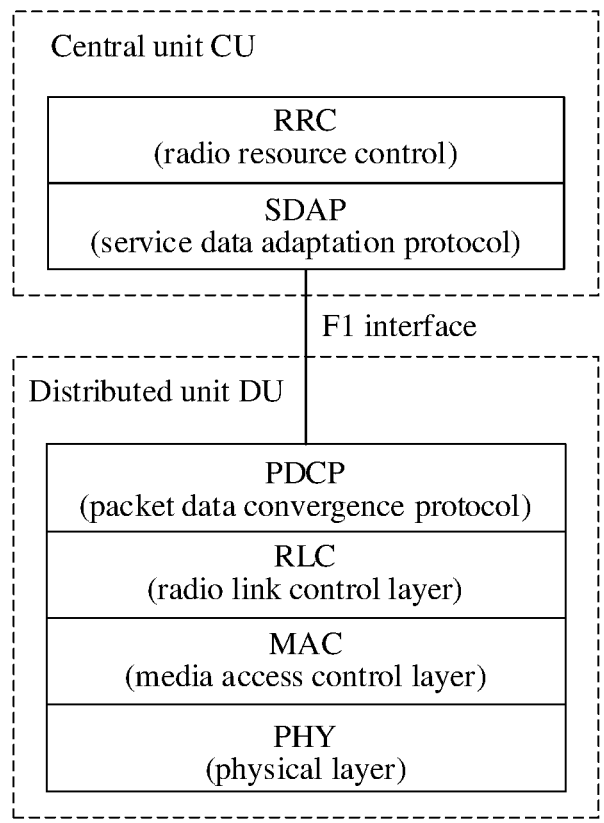

In embodiments of this application, the RAN device may include a CU and a DU, and a plurality of DUs may be centrally controlled by one CU. For example, an interface between the CU and the DU may be referred to as an F1 interface. A control plane (CP) interface may be F1-C, and a user plane (UP) interface may be F1-U. The CU and the DU may be classified based on the protocol layers of the wireless network: For example, as shown in FIG. 2*b*, functions of a PDCP layer and a protocol layer above the PDCP layer are set on the CU, and a function of a protocol layer (for example, an RLC layer and a MAC layer) below the PDCP layer is set on the DU. For another example, as shown in FIG. 2*c*, a function of a protocol layer above the PDCP layer is set on the CU, and functions of the PDCP layer and a protocol layer below the PDCP layer is set on the DU.

It may be understood that processing function division of the CU and the DU based on the protocol layers is merely an example, and there may be other division. For example, the CU or the DU may be divided into functions having more protocol layers. For another example, the CU or the DU may be further divided into some processing functions having protocol layers. In a design, some functions of the RLC layer and functions of the protocol layers above the RLC layer are set on the CU, and remaining functions of the RLC layer and functions of the protocol layers below the RLC layer are set on the DU. In another design, division of functions of the CU or the DU may alternatively be performed based on service types or other system requirements. For example, division may be performed based on latencies. Functions whose processing time needs to meet a latency requirement are set on the DU, and functions whose processing time does not need to meet the latency requirement are set on the CU. In another design, the CU may alternatively have one or more functions of the core network. For example, the CU may be set on a network side for ease of centralized management. The DU has a plurality of radio frequency functions, or the radio frequency functions may be set remotely. This is not limited in embodiments of this application.

Optionally, the DU and the radio frequency apparatus may be divided at a physical layer (PHY). For example, the DU may implement a higher-layer function at the PHY layer, and the radio frequency apparatus may implement a lower-layer function at the PHY layer. When used for sending, a function of the PHY layer may include a cyclic redundancy check (CRC) code addition, channel coding, rate matching, scrambling, modulation, layer mapping, precoding, resource mapping, physical antenna mapping, and/or radio frequency sending function. When used for reception, a function of the PHY layer may include CRC, channel decoding, rate de-matching, descrambling, demodulation, layer de-mapping, channel detection, resource de-mapping, physical antenna de-mapping, and/or a radio frequency receiving function. The higher-layer function of the PHY layer may include some functions of the PHY layer. For example, the some functions are closer to the MAC layer. The lower-layer function of the PHY layer may include another part of functions of the PHY layer. For example, the part of functions are closer to the radio frequency function. For example, the higher-layer function of the PHY layer may include CRC code addition, channel coding, rate matching, scrambling, modulation, and layer mapping, and the lower-layer function of the PHY layer may include precoding, resource mapping, physical antenna mapping, and radio frequency sending functions. Alternatively, the higher-layer function of the PHY layer may include CRC code addition, channel coding, rate matching, scrambling, modulation, layer mapping, and precoding. The lower-layer function of the PHY layer may include resource mapping, physical antenna mapping, and radio frequency sending functions.

Optionally, the radio frequency apparatus may also be referred to as a radio apparatus.

Figure 2D:
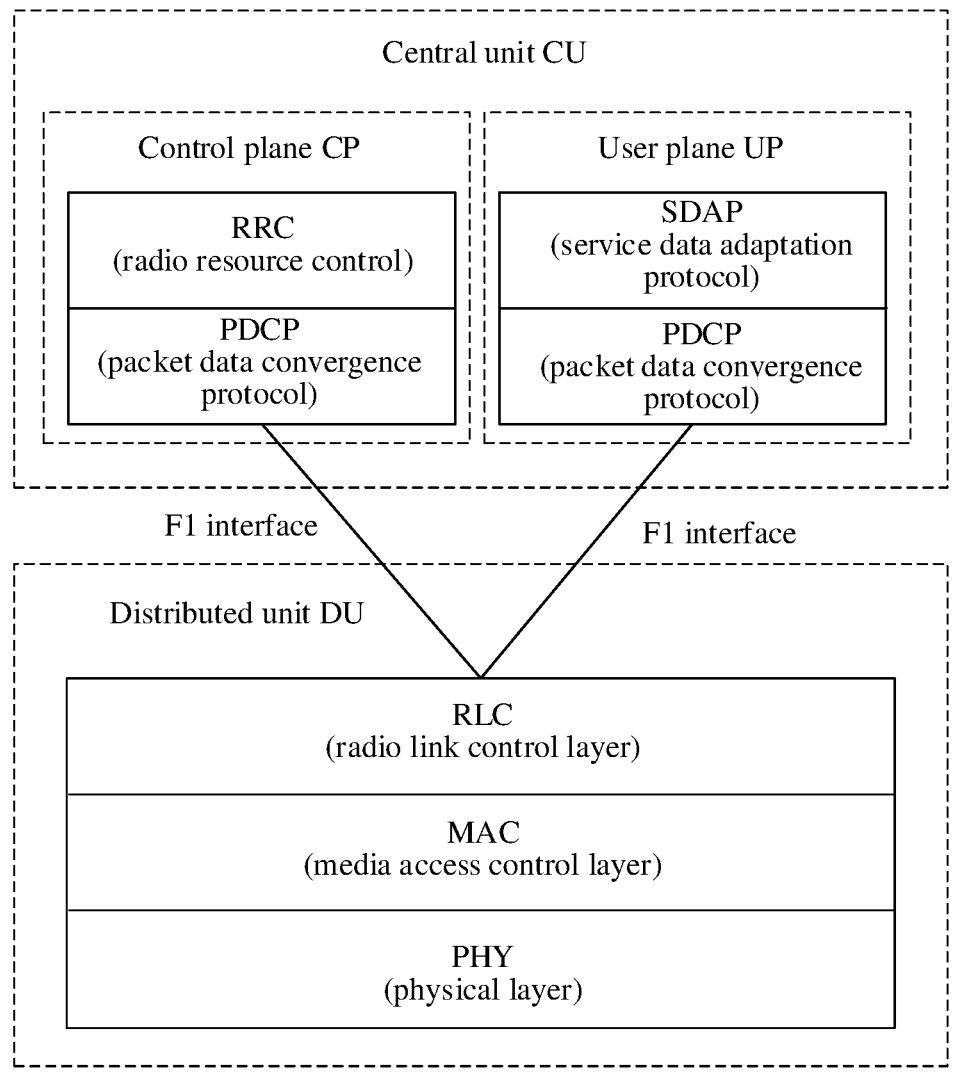

For example, a function of the CU may be implemented by one entity, or may be implemented by different entities. For example, as shown in FIG. 2d, functions of the CU may be further divided, that is, a control plane and a user plane are separated and implemented by different entities, which are a control plane CU entity (that is, a CU-CP entity) and a user plane CU entity (that is, a CU-UP entity). The CU-CP entity and the CU-UP entity may be coupled to the DU to jointly complete a function of the RAN device.

It should be noted that in the architectures shown in FIG. 2b to FIG. 2d, signaling generated by the CU may be sent to the terminal device through the DU, or signaling generated by the terminal device may be sent to the CU through the DU. The DU may transparently transmit the signaling to the terminal device or the CU by directly encapsulating the signaling at a protocol layer without parsing the signaling. In the following embodiments, if transmission of such signaling between the DU and the terminal device is involved, sending or receiving of the signaling by the DU includes this scenario. For example, signaling at the RRC or PDCP layer is finally processed as signaling at the physical layer and sent to the terminal device, or is converted from signaling received from the physical layer. In this architecture, it may be considered that the signaling at the RRC layer or the PDCP layer is sent by the DU, or sent by the DU and the radio frequency apparatus.

Optionally, any one of the DU, the CU, the CU-CP, the CU-UP, and the radio frequency apparatus may be a software module, a hardware structure, or a software module+a hardware structure. This is not limited. Different entities may exist in different forms, which is not limited. For example, the DU, the CU, the CU-CP, and the CU-UP are software modules, and the radio frequency apparatus is a hardware structure. These modules and methods performed by these modules also fall within the protection scope of embodiments of this application.

3. CN

The CN may include one or more CN devices, for example, the CN device 120. A 5G (5G) communication system is used as an example. The CN may include an access and mobility management function (AMF) network element, a session management function (SMF) network element, a user plane function (UPF) network element, a policy control function (PCF) network element, a unified data management (UDM) network element, an application function (AF) network element, and the like.

In embodiments of this application, an apparatus configured to implement a function of the core network device may be a core network device, or may be an apparatus that can support the core network device in implementing the function, for example, a chip system, a hardware circuit, a software module, or a hardware circuit plus a software module. The apparatus may be installed in the core network device or may be used in match with the core network device. In the technical solutions provided in embodiments of this application, the technical solutions provided in embodiments of this application are described by using an example in which the core network device is the apparatus for implementing the function of the core network device.

It should be understood that quantities of devices in the communication system shown in FIG. 1 are merely used as an example. Embodiments of this application are not limited thereto. In an actual application, the communication system may further include more terminal devices and more RAN devices, and may further include another device.

The network architecture shown in FIG. 1 may be applied to communication systems of various radio access technologies (RAT), for example, a 4G (or referred to as LTE) communication system, or a 5G (or referred to as new radio (NR)), or a transition system between an LTE communication system and a 5G communication system, or certainly a future communication system, for example, a 6G communication system. The transition system may also be referred to as a 4.5G communication system. The network architecture and the service scenario described in embodiments of this application are intended to describe the technical solutions in embodiments of this application more clearly, and do not constitute a limitation on the technical solutions provided in embodiments of this application. A person of ordinary skill in the art may know that, with evolution of the communication network architecture and emergence of new service scenarios, the technical solutions provided in embodiments of this application are also applicable to similar technical problems.

In a wireless communication system, a UE may hand over a serving cell. In the following description, a base station to which a current serving cell of the UE belongs may be referred to as a source base station, and a base station to which a serving cell to which the UE is to be handed over belongs may be referred to as a target base station. There are two mechanisms for UE to be handed over between serving cells: One mechanism is that handover is triggered by a base station. The source base station sends a handover command to the UE, and the UE performs handover to the target cell Based on configuration information of a target cell in the handover command. The UE may send a measurement report to the source base station. The measurement report may include quality information of a serving cell and/or a neighboring cell, and the like. The source base station may determine a handover policy, for example, determine the handover policy based on information reported by the UE and information such as cell load, and indicate the handover policy to the UE by using a handover command. The other mechanism is that handover is triggered by the UE. The UE selects a target cell from one or more candidate cells and performs handover to the target cell. For example, the source base station configures one or more candidate cells for the UE by using a handover command, and the one or more candidate cells each are configured with a corresponding trigger condition. When the UE determines that a trigger condition is met, the UE may use a candidate cell corresponding to the trigger condition as a target cell, and the UE performs handover to the target cell.

Regardless of the foregoing handover manner, the source base station determines the handover policy or the candidate cell nearly in real time, and the determined handover policy or the candidate cell may be less accurate, causing an additional handover latency. Handover triggered by the base station is used as an example. After the source base station determines a target cell (for example, a target cell with a best index or a best comprehensive index) for the UE, the source base station first sends a handover request to a target base station to which the target cell belongs, and the source base station configures the target cell for the UE only after the target base station accepts the handover request. However, when the source base station sends the handover request to the target base station, the target base station may reject the handover request from the source base station due to reasons such as an excessive load, a limited capacity, or a management policy of the target cell. The source base station needs to reselect a new target cell for the UE, and initiates a handover request to a target base station to which the new target cell belongs. This causes an extra handover latency. Further, an extra handover latency may further cause a connection failure of the UE to the source base station. For example, the UE is in a moving state. As the UE moves, a connection between the UE and the source base station becomes weaker, and the UE is not handed over to a new serving cell for a long time, resulting in a connection failure between the UE and the source base station.

An embodiment of this application provides a cell handover method. The method can resolve problems such as the additional handover latency to some extent. The method includes: Before determining a serving cell to which UE can be handed over, a source base station predicts, based on artificial intelligence (AI), the serving cell to which the UE can be handed over, which is referred to as an AI target cell. The source base station sends a first request message to a base station corresponding to the AI target cell in advance, to determine whether the base station corresponding to the AI target cell accepts the request of the source base station. If the base station corresponding to the AI target cell does not accept the request of the source base station, the source base station no longer configures the cell for the UE, and performs a handover. According to the method in embodiments of this application, the source base station may perform handover preparation with the predicted AI target cell in advance, to avoid an additional handover latency to some extent.

Embodiments of this application relate to a process of predicting, by using an AI technology, a serving cell to which the UE can be handed over. Therefore, for ease of understanding, the AI technology is first described. It may be understood that this description is not intended as a limitation on embodiments of this application.

Figure 3A:
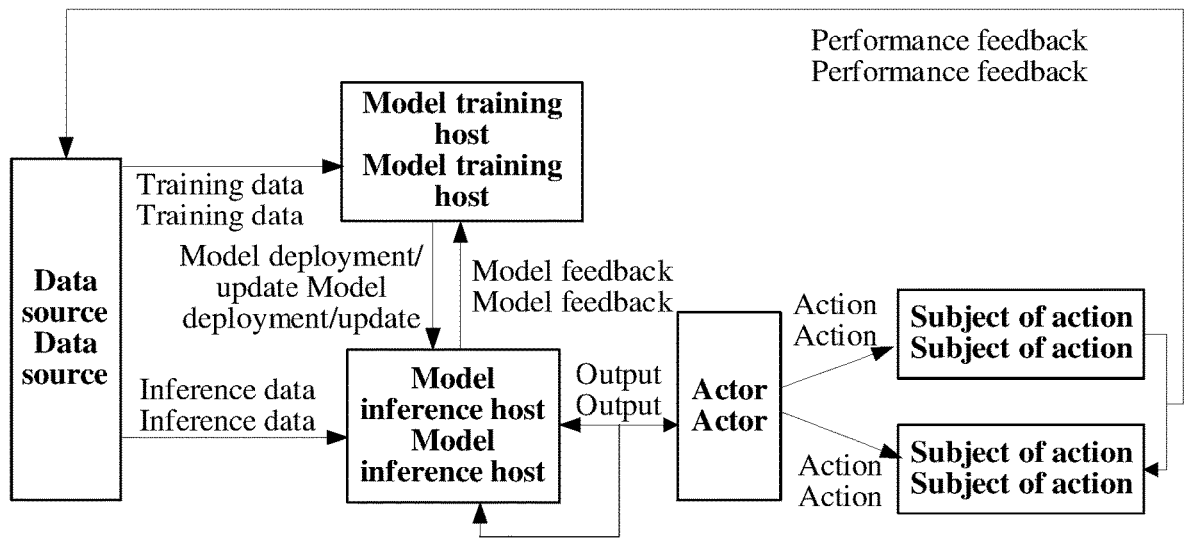
FIG. 3a, FIG. 3b, FIG. 3c, and FIG. 3d are schematic diagrams of AI models according to an embodiment of this application.

AI is a technology that performs complex calculation by simulating the human brain. With the improvement of data storage and capabilities, AI is increasingly applied. Release 17 (R17) of the 3rd generation partnership project (3GPP) passes a study item (SI) and proposes the application of AI to NR. FIG. 3a is an example diagram of a first application framework of AI in NR.

A data source (data source) is configured to store training data and inference data. A model training host (model training host) analyzes or trains training data (training data) provided by the data source to obtain an AI model, and deploys the AI model in a model inference node (model inference host). The model inference host uses the AI model to perform inference based on inference data provided by the data source, to obtain an inference result. The inference result is used to provide reasonable AI-based prediction on network running, or guide a network to perform policy configuration or policy adjustment. Related policy configuration or policy adjustment is uniformly planned by an actor (actor) entity, and sent to a plurality of objects of action (for example, a network entity) for execution. At the same time, after a related policy is applied, specific performance of the network can be input to the data source for storage.

Figure 3B:
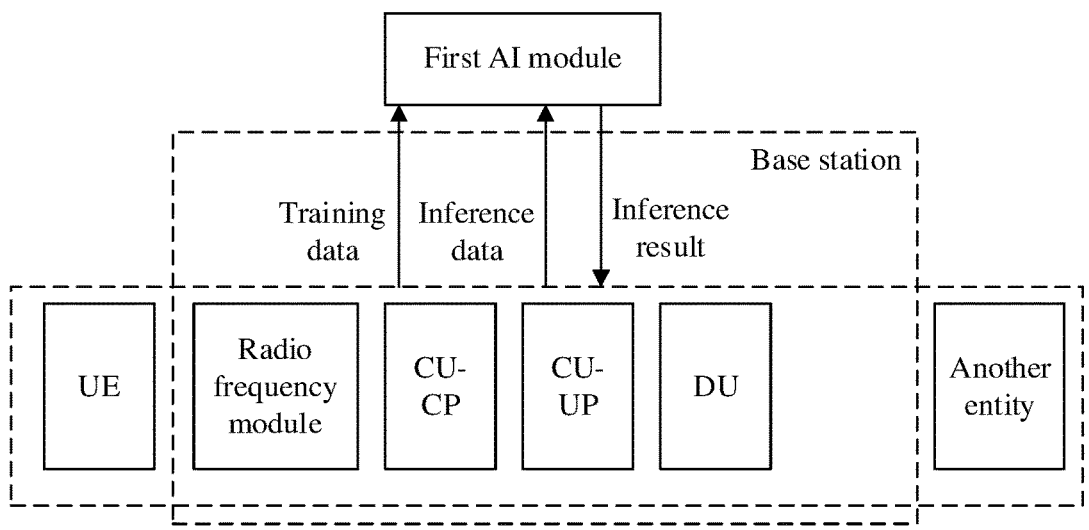
Figure 3C:
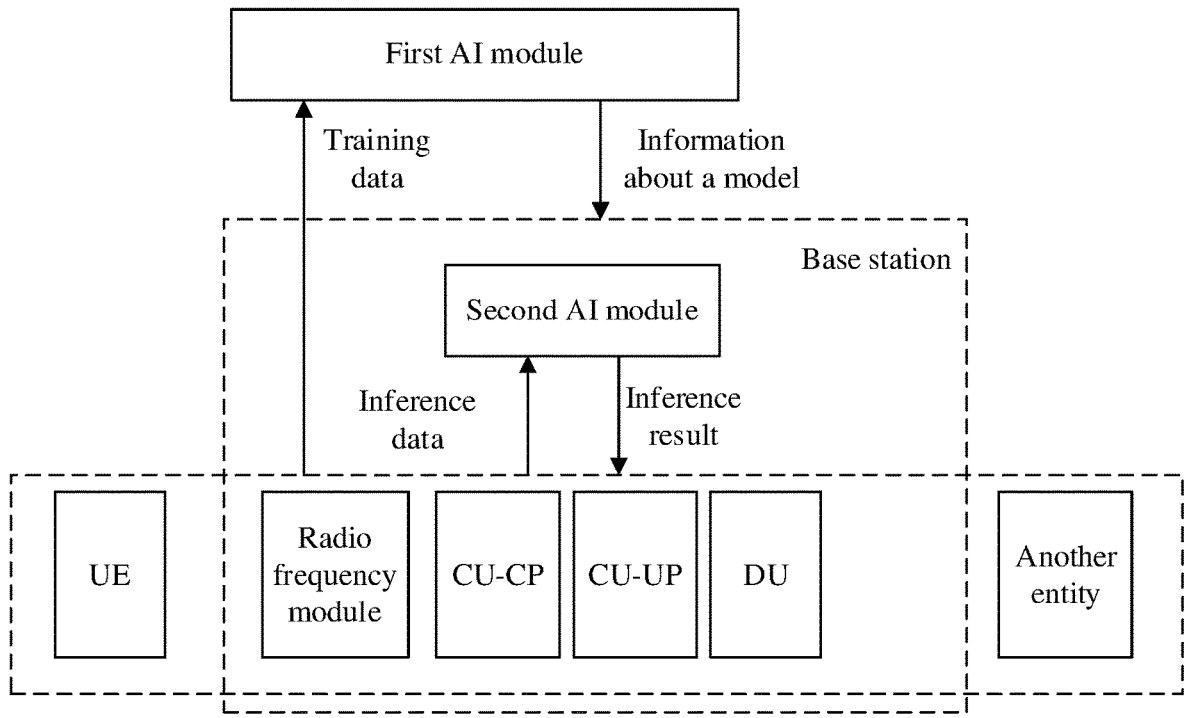
Figure 3D:
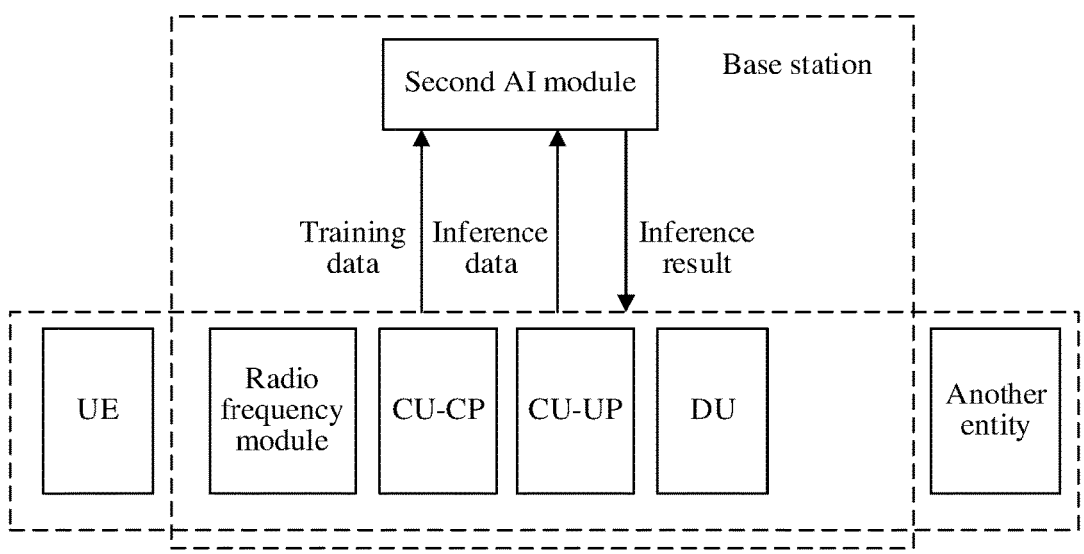

FIG. 3b, FIG. 3c, or FIG. 3d is an example diagram of a second application framework of AI in NR.

A first AI module independent of a base station receives training data. The first AI module analyzes or trains the training data to obtain an AI model. For a parameter, the first AI module may perform inference by using a corresponding AI model and inference data to obtain the parameter. For details, refer to FIG. 3b. Alternatively, the first AI module may send information about the AI model to a second AI module located in the base station (or described as being located in a RAN), and the second AI module performs inference by using a corresponding AI model and inference data to obtain the parameter. For details, refer to FIG. 3c. Alternatively, the AI model used by the second AI module for inference may be obtained by the second AI module by receiving training data and training the training data. For details, refer to FIG. 3d.

It should be noted that in the foregoing framework in FIG. 3a to FIG. 3d, the AI model may be referred to as a model for short, and may be considered as a mapping from an input measurement quantity (measurement information) to an output parameter. The input measurement quantity may be one or more measurement quantities, and the output parameter may be one or more parameters. The training data may include a known input measurement quantity, or include a known input measurement quantity and a corresponding output parameter, and is used to train the AI model. The training data may be data from a base station, a CU, a CU-CP, a CU-UP, a DU, a radio frequency module, UE, and/or another entity, and/or data obtained through inference by using an AI technology. This is not limited. The inference data includes an input measurement quantity, which is used to infer a parameter by using a model. The inference data may be data from a base station, a CU, a CU-CP, a CU-UP, a DU, a radio frequency module, UE, and/or another entity. An inferred parameter may be considered as policy information and sent to the object of action. The inferred parameter may be sent to the base station, the CU, the CU-CP, the CU-UP, the DU, the radio frequency module, the UE, or the like, to perform policy configuration or policy adjustment. AI models used to infer different parameters may be the same or different, which is not limited.

It may be understood that, in embodiments of this application, the UE and/or the base station may perform some or all of the steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may be performed.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

Embodiment 1

Embodiment 1 of this application provides a cell handover method, including: A source base station determines an AI target cell. The AI target cell may also be referred to as a first cell, a predicted cell, a potential cell, or the like. This is not limited. Regardless of a name used, the cell determined by the source base station is a predicted serving cell to which the UE can be handed over or a serving cell that is inferred according to an AI technology and to which the UE can be handed over. The following uses the AI target cell as an example for description. The source base station outputs a first request message. The first request message is used to request a target base station corresponding to the AI target cell to allocate, to UE, a resource corresponding to the AI target cell. Optionally, the method further includes: The source base station obtains a first response message of the target base station. The first response message is in response to the first request message. A process in which the source base station determines the AI target cell may be described as follows:

In a design, an AI device is separately deployed, and the AI device is referred to as a remote intelligent communication device, a wireless intelligent controller, an AI node, or the like. This is not limited. In a possible implementation, the AI device may include at least one of the data source, the model training host, the model inference host, or the like shown in FIG. 3a. In another possible implementation, the AI device may include the first AI module, the second AI module, and/or the like in FIG. 3b, FIG. 3c, or FIG. 3d. For example, the AI device may infer, based on an AI model, the AI target cell to which the UE can be handed over. The source base station may obtain a first message from the AI device. The first message indicates at least the AI target cell.

Optionally, the first message may further indicate at least one of the following: at least one type of information such as a type of AI handover that can be performed by the source base station, activation time information, expiration time information, or prediction accuracy of the AI target cell. For the activation time information, the expiration time information, and the AI handover type, refer to the following description. It may be understood that the activation time information and the expiration time information may be directly indicated by the first message, or may be determined by performing specific calculation on information in the first message. For example, the first message indicates the activation time information and valid duration information. The expiration time information may be determined based on the activation time information and the valid duration information. In this case, it may also be understood that the first message indicates the activation time information and the expiration time information.

Further, optionally, before the source base station obtains the first message from the AI device, the source base station and the AI device may further interact with each other. For example, the AI device sends first indication information to the source base station. The first indication information indicates an AI handover type supported by the AI device, accuracy of AI predicted information of the AI device, and/or the like. The source base station sends second indication information to the AI device. The second indication information indicates at least one of information such as an AI handover type supported by the source base station and a quantity of supported AI target cells.

In another design, a function of an AI module may be integrated into the source base station, and the source base station may infer, in an AI manner, the serving cell to which the UE can be handed over, that is, the AI target cell, or the like.

In the foregoing two designs, after the source base station determines the AI target cell, the source base station may send the first request message to the target base station to which the AI target cell belongs, to request the target base station to allocate, to the UE, a corresponding resource for accessing the AI target cell. Optionally, when receiving the first request message, the target base station may send, to the source base station, the first response message in response to the first request message. For example, the first response message indicates whether the target base station accepts the request of the source base station.

Figure 4:
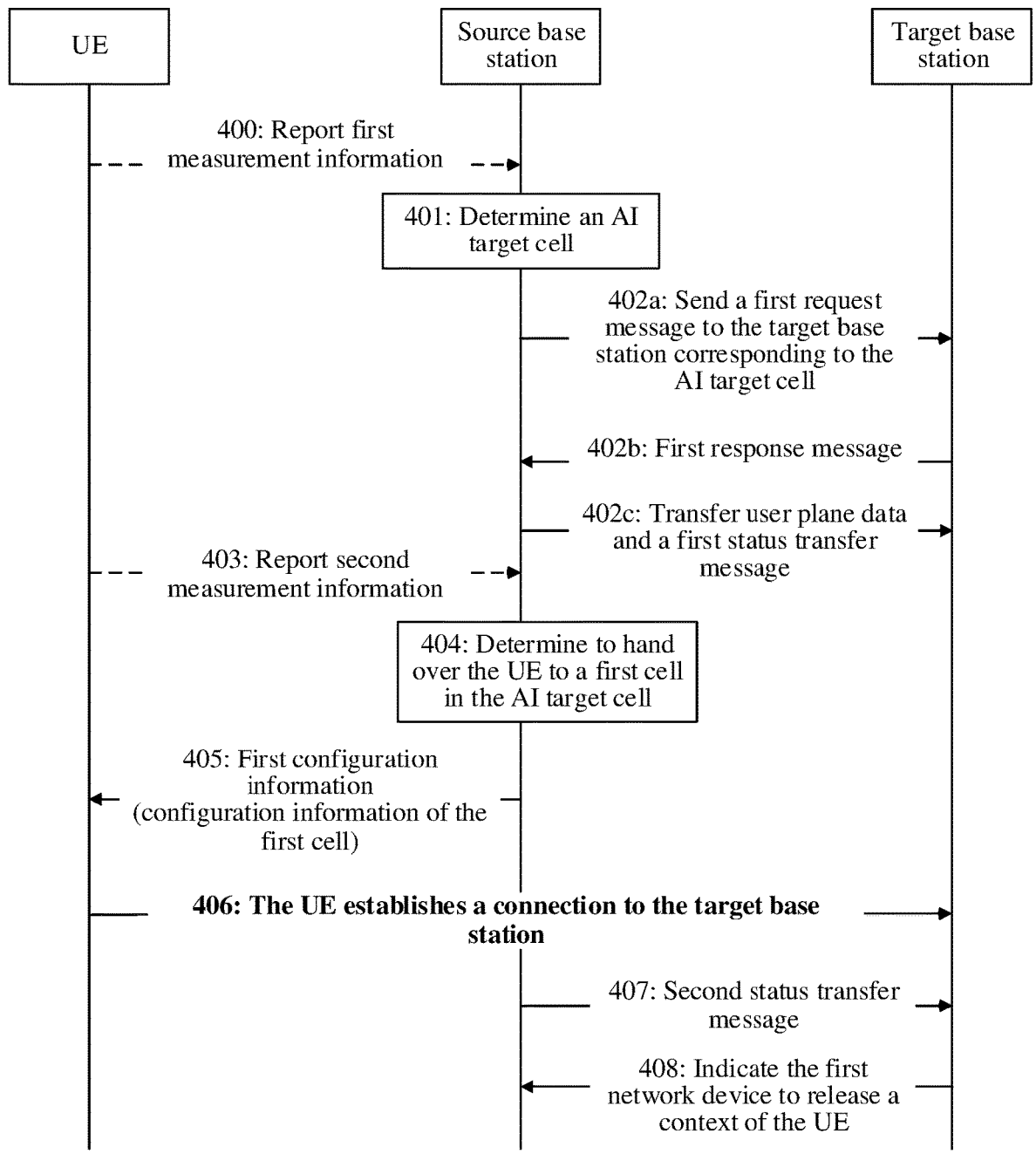
FIG. 4 is a flowchart of cell handover according to Embodiment 1 of this application.

As shown in FIG. 4, a procedure of a cell handover method is provided. In the procedure, an example in which the source base station performs AI inference and determines the AI target cell is used for description, and the procedure includes at least the following steps.

Step 400: The UE reports first measurement information to the source base station. In a design, the UE may report a first measurement report to the source base station. The measurement report carries the first measurement information. Step 400 is optional.

For example, the first measurement information includes identification information of a cell and quality information of a cell. The cell may be a serving cell and/or a neighboring cell, and this is not limited. In a design, the UE may periodically report the first measurement information to the source base station. For example, the UE may periodically measure quality information of a serving cell and/or quality information of a neighboring cell, and then periodically report the measured information to the source base station. Alternatively, the UE may periodically measure the quality information of the serving cell and/or the quality information of the neighboring cell, and then report the measured information to the source base station when a condition is met.

1. Identification Information of a Cell Included in the First Measurement Information In this embodiment of this application, the identification information of the cell may include at least one of a cell global identifier (CGI), a physical cell identifier (PCI) and a frequency, a cell identifier (cell ID), a non-public network identifier (NPN ID), a non-terrestrial network identifier (NTN ID), another cell identifier, or the like of the cell. The CGI may include a public land mobile network (PLMN ID), a cell ID, and the like. Optionally, the identification information of the cell may further include a tracking area code (TAC) and/or identification information of a network device to which the cell belongs, for example, a global network device identifier.

It should be noted that, in the description of this application, the identification information of the cell may be a cell identifier corresponding to a cell accessed by the UE. The cell accessed by the UE may also be referred to as a current serving cell of the UE. Considering that one cell may be shared by a plurality of operators at the same time, different operators may allocate different identifiers to the same cell, and the cell identifier may also be the first cell identifier in at least one cell identifier sent by a base station to which the cell accessed by the UE belongs. For example, a cell is shared by networks of a plurality of operators at the same time, different operators may allocate different identifiers to the cell, and the cell sends the plurality of cell identifiers to the UE. The identifier of the cell in this embodiment of this application may be the first cell identifier in the plurality of identifiers sent by the cell accessed by the UE. For example, a cell accessed by the UE is shared by two operators at the same time, and cell identifiers allocated by the two operators to the cell are respectively PLMN1+CELL ID1 and PLMN2+CELL ID2. If a sequence of the cell identifier in sent cell information list is {LMN1+CELL ID1, PLMN2+CELL ID2}, the cell identifier in this embodiment of this application may be specifically PLMN1+CELL ID1.

2. Quality Information of a Cell Included in the First Measurement Information

In this embodiment of this application, the UE may obtain the quality information of the cell by measuring at least one of a downlink synchronization channel, a channel state information reference signal, a demodulation reference signal (DMRS), a cell-specific reference signal (CRS), a synchronization signal block (SSB), a synchronization signal/physical broadcast channel block, or another downlink signal. For example, the quality information of the cell may include at least one of received signal code power (RSCP), reference signal received power (RSRP), reference signal received quality (RSRQ), a signal noise ratio (SNR), a signal to interference plus noise ratio (SINR), a reference signal strength indication (RSSI), or other signal quality.

Optionally, the quality information of the cell may be at at least one of a cell level, a beam level, a synchronization signal/physical broadcast channel block (SS/PBCH Block) level, channel state information reference signal (CSI-RS) level, a numerology (numerology) level, a slicing (slicing) level, or a bandwidth part (BWP) level. A level of the quality information of the cell is a granularity at which the quality information of the cell is measured. For example, the quality information of the cell being at the cell level means that the UE measures each cell in a plurality of to-be-measured cells, to obtain quality of each cell. Alternatively, the quality of the cell being at the beam level means that the cell includes at least one beam, and the UE obtains the quality information of the cell by measuring a beam in the cell. For example, a cell includes three beams, and the UE may separately measure a beam 1, a beam 2, and a beam 3 in the three beams, to obtain quality information of the beam 1 and quality information of the beam 2 that meet a beam quality condition. Optionally, the UE may then obtain, for example, a larger value, an average, or a weighted sum based on the quality information of the beam 1 and the quality information of the beam 2, to obtain the quality information of the cell. Alternatively, the UE may report both the quality information of the beam 1 and the quality information of the beam 2. The quality information of the cell measured by the UE based on another granularity is similar to the foregoing, and is not described again.

It should be noted that if the quality information of the cell is at the beam level, the synchronization signal/physical broadcast channel block level, the numerology level, the slicing level, the bandwidth part level, or the like, the identification information of the cell further includes at least one of identification information of a corresponding beam, identification information of a corresponding synchronization signal/physical broadcast channel block, identification information of a corresponding channel state information reference signal, identification information of corresponding numerology, identification information of a corresponding slice, identification information of a corresponding bandwidth part, or the like.

In a design, when receiving the first measurement information, the source base station may determine, based on the first measurement information, whether the UE needs to be handed over to a serving cell. If the UE needs to be handed over to a serving cell, the source base station performs Step 401.

Step 401: The source base station performs AI inference based on at least one piece of the following information to determine the AI target cell.

It should be noted that the source base station obtains the AI target cell through AI inference. Because the AI target cell is a serving cell that is predicted by the source base station and to which the UE can be handed over, the AI target cell obtained through inference may also be referred to as a predicted AI target cell or the like. There are one or more AI target cells, and this is not limited.

In a design, the at least one piece of information used by the source base station to infer the AI target cell includes at least one of the following:

First measurement information of the UE: The first measurement information may be reported by the UE in step 400.

Load information of a serving cell: Because the source base station is a base station to which the serving cell of the UE belongs, the source base station can obtain the load information of the serving cell. The load information of the serving cell may be real-time load information of the serving cell, historical load information of the serving cell, and/or the like.

Load information of a neighboring cell: If the neighboring cell belongs to the source base station, the source base station may directly obtain the load information of the neighboring cell. Otherwise, the source base station may obtain the load information and the like of the neighboring cell through a base station to which the neighboring cell belongs. The load information of the neighboring cell may be real-time load information of the neighboring cell, historical load information of the neighboring cell, and/or the like.

UE-related information: The UE-related information may include at least one of track information of the UE, geographical coordinate information of the UE, a movement direction of the UE, a movement speed of the UE, or the like.

The UE-related information may be reported by the UE to the source base station, obtained by the source base station by monitoring the UE, obtained by the source base station through another network device, or the like. This is not limited. The UE-related information may be real-time information of the UE, historical information of the UE, and/or the like. For example, the geographical coordinate information of the UE may be current real-time geographical coordinates of the UE, and/or historical geographical coordinates of the UE.

In a design, the source base station may perform AI inference based on the at least one piece of information, to obtain the AI target cell. There may be one or more AI inference processes, and this is not limited. For example, in a possible implementation, the model training host in FIG. 3a to FIG. 3d may analyze training data provided by the data source, to obtain an AI model. The model inference host inputs the at least one piece of information to the AI model, and an output of the AI model is the AI target cell. Alternatively, in another possible implementation, the model training host in FIG. 3a to FIG. 3d may analyze training data provided by the data source, to obtain an AI model A and an AI model B. The model inference host may input the at least one piece of information to the AI model A, and an output of the AI model A is future information of the at least one piece of information, for example, at least one piece of information such as future load information of the serving cell or the neighboring cell, a future track of the UE, a future movement speed of the UE, or future geographical coordinates of the UE. Then, the model inference host may input at least one piece of real-time information, historical information, future information, or the like of the at least one piece of information into the AI model B, and an output of the AI model B is the AI target cell.

Step 402a: The source base station sends a first request message to the target base station corresponding to the AI target cell. In a design, the first request message may be referred to as a handover request (handover request).

In a design, an interface can be directly used for communication between the source base station and the target base station. The interface may be an X2 interface, an Xn interface, another interface, or the like. This is not limited. The source base station may send the first request message to the target base station through the foregoing interface.

In another design, no interface can be directly used for communication between the source base station and the target base station. The source base station may send a part or all of content of the first request message to the target base station through a core network device. For example, the source base station may send the first request message to the core network device through an S1 interface, an NG interface, or another interface, and then the core network device forwards the first request message to the target base station.

All the following processes related to communication between the source base station and the target base station may have the foregoing description, and are not described one by one. For example, in Step 402b, the source base station may directly receive a first response message from the target base station through a direct communication interface. Alternatively, the source base station may receive the first response message or the like from the target base station through the core network device.

It can be learned from the foregoing description that there are one or more AI target cells. The source base station may send a corresponding first request message to each AI target cell. For example, if the source base station infers that there are three AI target cells, the source base station may send the first request message to each of target base stations to which the three AI target cells belong. In one case, a plurality of cells in the AI target cells inferred by the source base station may belong to a same target base station. To reduce signaling overheads, for the plurality of cells, the source base station may send the first request message to the target base station. The first request message may request the target base station to allocate resources to the UE for accessing the plurality of cells. In the procedure in FIG. 4, an example in which the source base station sends the first request message to one target base station is used for description.

In a design, the first request message is used to request the target base station corresponding to the AI target cell to allocate, to the UE, a resource corresponding to the AI target cell, and the first request message indicates at least one of the following:

identification information of the AI target cell;

a type of the handover being AI handover;

activation time information, where the activation time information indicates an earliest moment at which the UE can be handed over to the AI target cell, and for example, if the UE attempts to access the AI target cell earlier than the earliest moment, the base station corresponding to the AI target cell may reject the access;

expiration time information, where the expiration time information indicates a latest moment at which the UE can be handed over to the AI target cell, and for example, if the UE still does not access the AI target cell after the latest moment, the base station corresponding to the AI target cell may delete information related to the AI target cell, for example, early transferred user plane data and a context of the UE in the following; or prediction accuracy of the target cell.

Optionally, before step 402a, the method may further include: The source base station exchanges AI information with the target base station. For example, the target base station may send the AI information to the source base station. The AI information indicates at least one of the following:

Whether the target base station supports AI handover: For example, a binary bit may be used to indicate whether the target base station supports AI handover. "0" indicates that the target base station does not support AI handover, "1" indicates that the target base station supports AI handover, and the like. Alternatively, "false (FALSE)" indicates that the target base station does not support AI handover, "true (TRUE)" indicates that the target base station supports AI handover, and the like. For example, if the target base station supports AI handover, and subsequently, if an AI target cell predicted by the source base station includes a cell covered by the target base station, the source base station may send the first request message in step 402a to the target base station. Otherwise, the source base station does not send the first request message in step 402a to the target base station.

AI handover type supported by the target base station: A meaning of the AI handover type is first described: For example, there are a plurality of types of current handover mechanisms, for example, legacy handover (legacy handover or ordinary handover), dual active protocol stack handover (DAPS HO), conditional handover (CHO), random access-less handover (RACH-less HO), or another type. The AI handover type may be specifically a handover mechanism that supports AI handover in the plurality of handover mechanisms. For example, when it is predicted, through AI prediction, that the cell to which the UE is to be handed over is a cell 1, if the legacy handover mechanism supports AI handover, the UE may be handed over to the cell 1 by using the legacy handover mechanism, and the AI handover type may include the legacy handover mechanism. The AI handover type supported by the target base station may be specifically a handover mechanism that is supported by the target base station and that can perform AI handover.

Information about a cell that is served by the target base station and that allows AI handover: For example, a quantity and/or cell identifiers of cells that are served by the target base station and that allow AI handover, or a quantity and/or cell identifiers of cells that are served by the target base station and that allow a type of AI handover. It may be understood that the target base station includes a plurality of cells, and whether each cell in the plurality of cells supports AI handover may be predefined or set. If a cell supports AI handover, it indicates that if the cell is determined, through AI prediction, as a cell to which the UE is to be handed over, that is, the AI target cell, the cell supports handover of the UE to the cell. If a cell does not support AI handover, it indicates that the source base station is not allowed to determine, through AI prediction, the cell as a cell to which the UE is to be handed over, that is, the AI target cell, or if the cell is determined, through AI prediction, as a cell to which the UE is to be handed over, that is, the AI target cell, the cell does not support handover of the UE to the cell. The information about a cell that is served by the target base station and that allows AI handover is described as follows: In a possible implementation, if a part of cells of the target base station support AI handover and a part of cells do not support AI handover, the target base station may explicitly indicate, to the source base station, identification information of a cell that is served by the target base station and that supports AI handover. The identification information of a cell that is served by the target base station and that supports AI handover may implicitly indicate a quantity of cells that are served by the target base station and that support AI handover. That is, in this case, the information about a cell that is served by the target base station and that allows AI handover includes the identification information of a cell that is served by the target base station and that supports AI handover. Alternatively, if all cells that are served by the target base station support AI handover, but considering a resource condition, because resources need to be reserved to support AI handover, only a part of the cells may be allowed to perform AI handover. In this case, the target base station may indicate, to the source base station, information about a cell that is served by the target base station and that allows AI handover. The cell information may include a cell identifier, a quantity of cells, and/or the like.

Step 402b: The source base station receives the first response message from the target base station, where the first response message is in response to the first request message. For example, the first response message may be referred to as a handover response message.

For example, the first response message may be an acknowledgment (ACK), for example, a handover request acknowledgment (handover request acknowledge) message. Alternatively, the first response message may be a negative acknowledgment (NACK), for example, a handover preparation failure (handover preparation failure) message, or a handover failure (handover failure) message. If the first response message is an ACK, it indicates that the target base station agrees that the UE is to be handed over to a cell served by the target base station; otherwise, it indicates that the target base station does not agree that the UE is to be handed over to a cell served by the target base station. Further, if the first response message is an ACK, the first response message may further include indication information of a cell that is served by the target base station and to which the UE is allowed to perform AI handover, for example, indication information including a quantity and/or identifiers of cells. It should be noted that "the quantity of cells that are served by the target base station and to which the UE is allowed to perform AI handover" indicated in the first response message may be the same as or different from the "quantity of cells that are served by the target base station and that allow AI handover" indicated in step 402a. For example, the quantity of cells that are served by the source base station and to which the current UE is allowed to perform AI handover is less than or equal to the quantity of cells that are served by the source base station and that allow AI handover. For example, if the source base station serves 10 cells, and 8 of the 10 cells support AI handover, the quantity of cells that are served by the source base station and that allow AI handover in step 402a is 8. In an implementation, if there are four cells to which the current UE is allowed to perform AI handover in the eight cells, the quantity of cells that are served by the target base station and to which the UE is allowed to perform AI handover in the first response message is 4.

Step 402c: The source base station transfers user plane data to the target base station.

Optionally, the source base station sends a first status transfer message to the target base station. The first status transfer message indicates a number of a first SDU in the user plane data transferred by the source base station to the target base station, and/or a number of an SDU that can be discarded in the transferred user plane data.

In this embodiment of this application, when the source base station receives the first response message from the target base station, and the first response message is an ACK, it indicates that the target base station agrees that the UE is to be handed over to a cell served by the target base station. The source base station may start transferring the user plane data to the target base station. Compared with a solution in which the source base station transfers the user plane data to the target base station when the UE successfully accesses the target base station, this embodiment can complete transfer of the user plane data of the UE as soon as possible, and reduce data interruption time caused by handover. Because the source base station transfers the user plane data to the target base station in advance, the user plane transfer may be referred to as early data transfer from the source base station to the target base station, and sending the first status transfer message by the source base station to the target base station may be referred to as early status transfer (early status transfer). It may be understood that the source base station may send at least one first status transfer message to the target base station, to indicate the target base station to update the number of the first SDU in a timely manner, and/or discard an unnecessary SDU in a timely manner.

For example, after the source base station receives the first response message from the target base station, 10 downlink (DL) SDUs in the source base station are not sent to the UE, and the source base station may send the 10 DL SDUs to the target base station. Further, the source base station may send the first status transfer message to the target base station, to indicate a number of the first DL SDU in the 10 DL SDUs. For example, if the number of the first DL SDU in the 10 DL SDUs is 1, the target base station may sequentially number the remaining nine DL SDUs as 2 to 9 based on the number 1 of the first DL SDU.

It may be understood that, in a process of early data transfer between the source base station and the target base station, the source base station and the UE still performs data transmission. The source base station may alternatively send, to the target base station, a number of a DL SDU that can be discarded in DL SDUs of the early transfer. The foregoing example is still used. In the early data transfer process, the source base station transfers 10 DL SDUs to the target base station. Subsequently, the source base station transmits five DL SDUs to the UE, and receives ACK feedbacks of the five DL SDUs. The source base station may send the first status transfer message to the target base station, to notify the target base station of the number of the DL SDU that can be discarded. The first status transfer message may include information indicating an SDU that needs to be discarded by the source base station. For example, the source base station may directly indicate numbers 1 to 5 to the target base station, to indicate that the target base station may discard DL SDUs numbered 1 to 5. Alternatively, the source base station may indicate a number 6 to the target base station, to indicate that the target base station may discard a DL SDU whose number is less than 6.

Optionally, step 403: The UE sends second measurement information to the source base station. In a design, the UE may send a second measurement report to the source base station. The second measurement report carries the second measurement information. For content of the second measurement information, refer to the first measurement information in Step 400.

Step 404: The source base station determines to hand over the UE to a first cell in the AI target cell.

In a design, when receiving the second measurement information of the UE, the source base station determines, based on the second measurement information, a cell to which the UE is to be handed over. In the description of Embodiment 1, an example in which the UE is to be handed over to the first cell in the AI target cell is used for description. In Embodiment 2, an example in which the UE is handed over to a second cell, and the second cell does not belong to the AI target cell is used for description.

Step 405: The source base station sends first configuration information to the UE, where the first configuration information indicates configuration information of the first cell.

In a design, the source base station may send an RRC reconfiguration message to the UE. The RRC reconfiguration message carries the first configuration information.

It should be noted that in the process of step 402*a* to step 402*c*, the target base station to which the first cell belongs has agreed that the UE is to be handed over to the first cell. Therefore, in step 405, the source base station only needs to directly send the configuration information of the first cell to the UE, and does not need to send the first request message to the target cell.

Step 406: The UE establishes a connection to the target base station.

In a design, the UE may send an RRC reconfiguration complete message to the target base station. The RRC reconfiguration complete message is used by the UE to establish a connection to the target base station.

Step 407: The source base station sends a second status transfer message to the target base station, where the second status transfer message indicates a status of data transmission between the source base station and the UE, the data transmission status includes an uplink data transmission status, a downlink data transmission status, and/or the like, and this is not limited. In a design, the status of data transmission between the source base station and the UE may be a sequence number of an SDU that has been transmitted between the source base station and the UE. In a design, the second status transfer message may also be referred to as sequence number status transfer (sequence number, SN, status transfer) or the like.

In the foregoing design, after the UE successfully accesses the target base station, the source base station may send, to the target base station, an SDU sequence number for data transmission with the UE. The target base station continues to perform data transmission with the UE based on the sequence number of the SDU for data transmission, to avoid retransmission and missing transmission of data to the UE, and the like.

Step 408: The target base station indicates the source base station to release a context of the UE (UE context release). Correspondingly, after receiving the indication, the source base station releases the context of the UE.

According to the foregoing solution, AI calculation and inference are used to predict a cell to which the UE is to be handed over, so that accuracy of a predicted target cell can be improved, and robustness of cell handover of the UE can be improved. The robustness may be stability, a success rate, and the like of cell handover of the UE. In addition, data is transferred to the base station corresponding to the AI target cell as early as possible, so that data interruption time after handover can be reduced.

Figure 5:
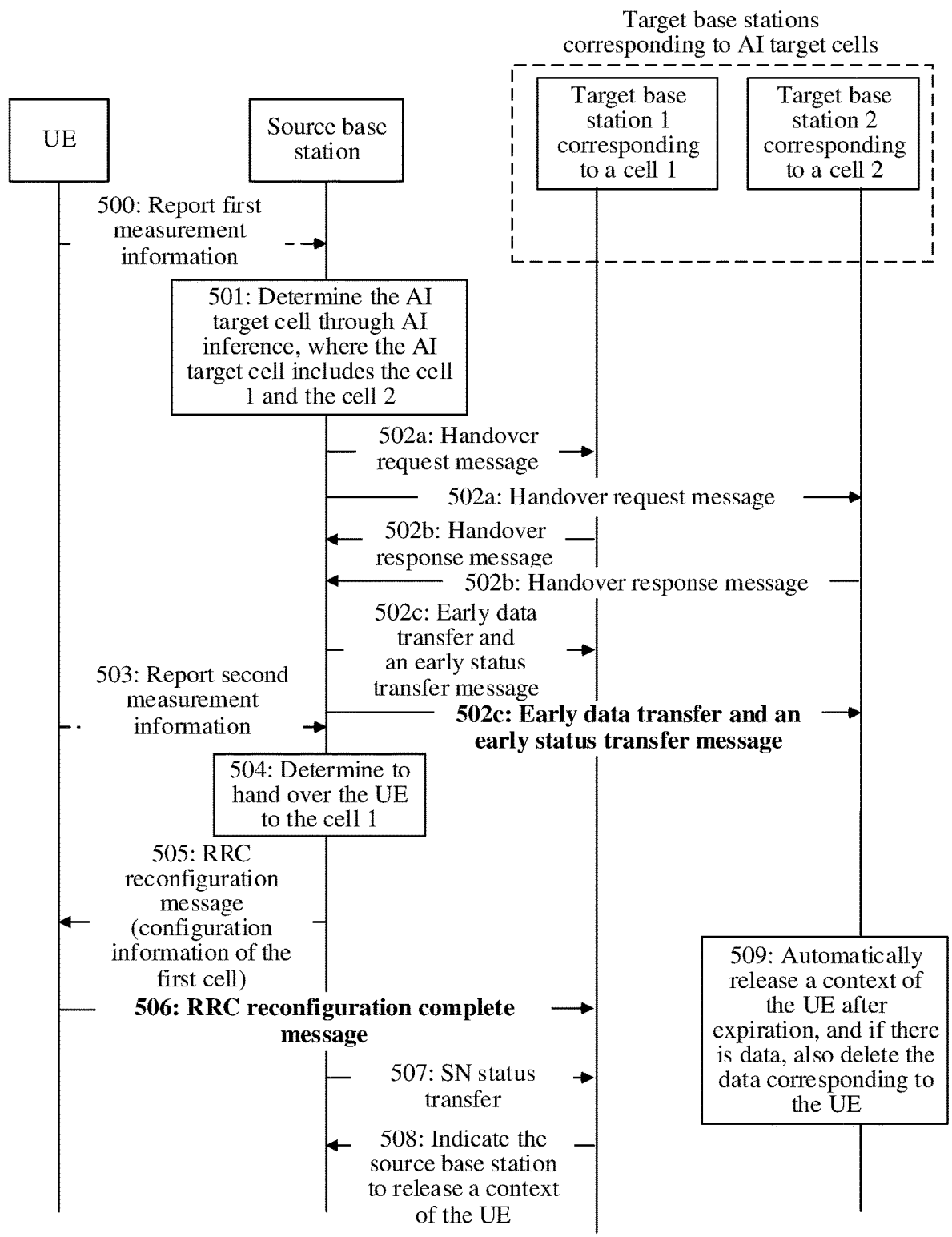
FIG. 5 is another flowchart of cell handover according to Embodiment 1 of this application.

As shown in FIG. 5, an example procedure of cell handover is provided. In the procedure, the AI target cell includes a cell 1 and a cell 2, and the cell 1 and the cell 2 belong to different base stations. The procedure includes at least the following steps.

Optionally, step 500: UE sends first measurement information to a source base station.

Step 501: The source base station determines the AI target cell through AI inference, where the AI target cell includes the cell 1 and the cell 2. In addition, a base station corresponding to the cell 1 is a target base station 1, and a base station corresponding to the cell 2 is a target base station 2.

Step 502*a*: The source base station separately sends a handover request message to the target base station 1 and the target base station 2.

Step 502*b*: The target base station 1 and the target base station 2 each send a handover request response message to the source base station.

Step 502*c*: The source base station separately performs early data transfer to the target base station 1 and the target base station 2, and the source base station separately sends an early status transfer message to the target base station 1 and the target base station 2.

Optionally, step 503: The UE sends second measurement information to the source base station, where the second measurement information is similar to content included in the first measurement information.

Step 504: The source base station determines to hand over the UE to the cell 1.

In a design, the source base station may determine, based on the second measurement information, to hand over the UE to the cell 1. In the procedure shown in FIG. 5, an example in which the base station determines that the UE is to be handed over to the cell 1 in the AI target cell is used for description.

Step 505: The source base station sends an RRC reconfiguration message to the UE, where the RRC reconfiguration message includes configuration information of the cell 1.

Step 506: The UE sends an RRC reconfiguration complete message to the target base station 1 corresponding to the cell 1.

Step 507: The source base station sends SN status transfer to the target base station 1 corresponding to the cell 1.

Step 508: The target base station 1 indicates the source base station to release a context of the UE. Correspondingly, after receiving the indication, the source base station releases the context of the UE.

Step 509: The target base station 2 corresponding to the cell 2 automatically releases context information of the UE after expiration. Optionally, if there is data of the UE, the data corresponding to the UE is also deleted.

Step 509 may be described as follows: The handover request message in step 502*a* may include expiration time information, and the expiration time information may indicate a latest moment at which the UE accesses the target cell 2. If the UE still does not access the target cell 2 after the latest moment, the target base station 2 may delete related information of the UE, including the context information of the UE, user plane data of the UE that is received during early transfer, and/or the like.

In the foregoing solution, an AI technology is combined with mobility, so that a proper handover cell is inferred in advance based on AI mobility mechanism prediction, to improve a handover preparation success rate and robustness. In addition, time information of the AI target cell is introduced, so that resources of an AI target base station can be occupied as few as possible, and resource utilization is improved.

Embodiment 2

A difference between Embodiment 2 and Embodiment 1 lies in that, in Embodiment 2, a cell to which UE is to be handed over and that is determined by a source base station is a second cell, and the second cell does not belong to an AI target cell inferred in advance.

Figure 6:
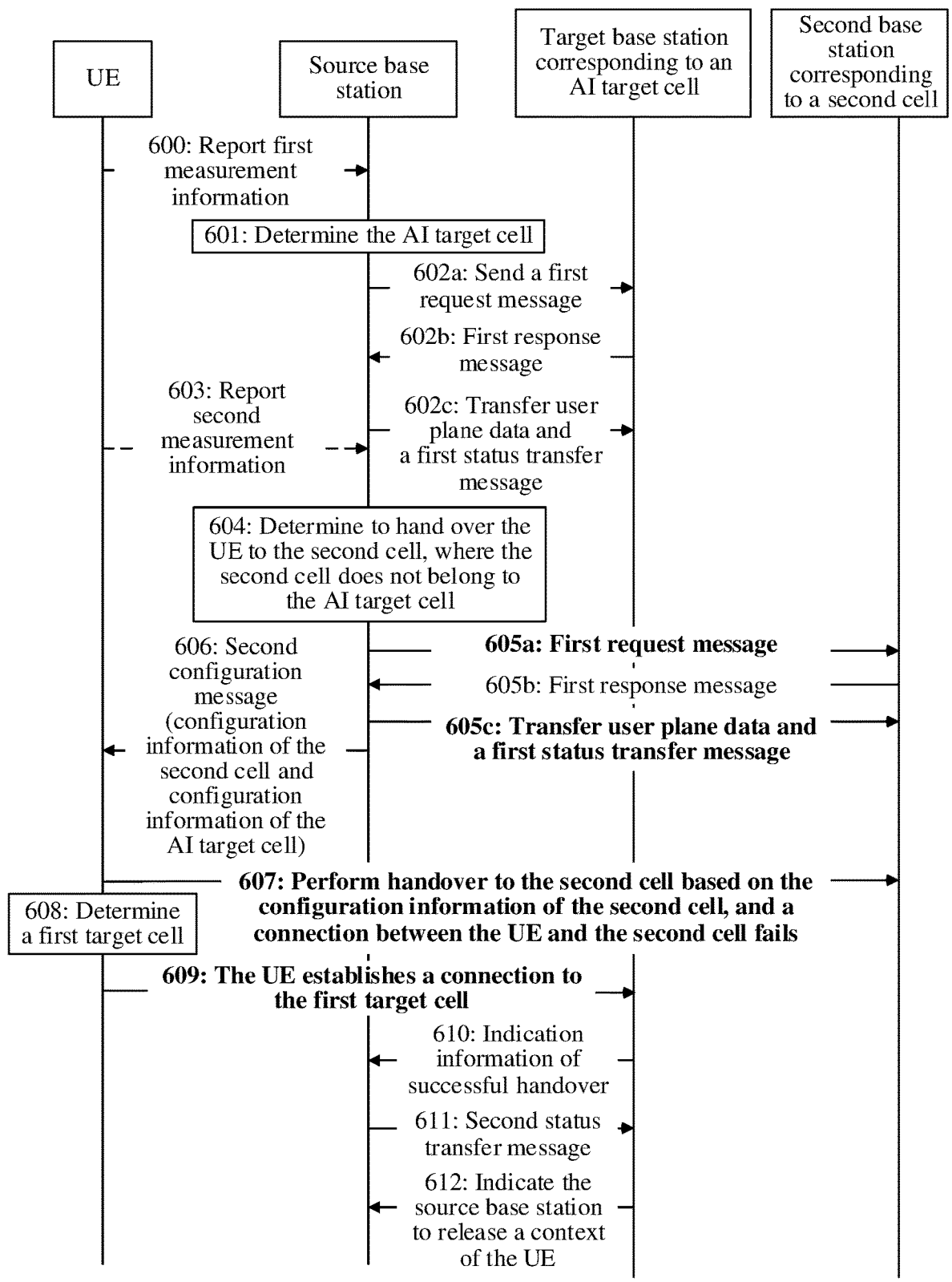
FIG. 6 is a flowchart of cell handover according to Embodiment 2 of this application.

As shown in FIG. 6, Embodiment 2 provides a cell handover procedure, and includes at least the following steps.

Optionally, step 600: The UE reports first measurement information to the source base station.

Step 601: The source base station determines the AI target cell.

Step 602*a*: The source base station sends a first request message to a target base station corresponding to the AI target cell.

Step 602*b*: The target base station sends a first response message to the source base station, where the first response message is in response to the first request message.

Step 602*c*: The source base station transfers user plane data to the target base station, and the source base station sends a first status transfer message to the target base station.

Optionally, step 603: The UE sends second measurement information to the source base station.

For Step 600 to Step 603, refer to related descriptions of Step 400 to Step 403 in Embodiment 1.

Step 604: The source base station determines to hand over the UE to the second cell, and the inferred AI target cell does not include the second cell.

Step 605*a*: The source base station sends a first request message to a second base station corresponding to the second cell, where the first request message is used to request the second base station to allocate a resource to the UE for accessing the second cell.

Step 605*b*: The second base station sends a first response message to the source base station, where the first response message is in response to the first request message. Similar to the foregoing description, the first response message may be an ACK or a NACK. If the first response message is an ACK, it indicates that the second base station agrees that the UE is to be handed over to the second cell. Otherwise, it indicates that the second base station does not agree that the UE is to be handed over to the second cell. If the second base station agrees that the UE is to be handed over to the second cell, the source base station may perform early data transfer to the second base station, that is, a process of Step 605*c*.

Step 605*c*: The source base station transfers the user plane data to the second base station, and the source base station sends the first status transfer message to the second base station.

Step 606: The source base station sends a second configuration message to the UE, where the second configuration message indicates configuration information of the second cell and configuration information of the AI target cell to the UE. In a design, the source base station may send an RRC reconfiguration message to the UE. The RRC reconfiguration message includes the second configuration message.

For example, the configuration information of the AI target cell may indicate at least one of the following:
identification information of the AI target cell;
random access information, where the random access information indicates a random access resource used by the UE to be handed over to the AI target cell;
activation time information; and
expiration time information.

Step 607: The UE performs handover to the second cell based on the configuration information of the second cell.

In a design, if a connection between the UE and the second cell fails, the UE performs step 608. The failure of the connection between the UE and the second cell may include: The connection fails when the UE performs handover to the second cell, or the connection fails within a short period of time after the UE successfully performs handover to the second cell.

Step 608: The UE determines a first target cell. A manner in which the UE determines the first target cell is not limited. The first target cell may belong to the AI target cell, or may not belong to the AI target cell.

Step 609: The UE establishes a connection to the first target cell.

For example, a process in which the UE establishes a connection to the first target cell may include: In a design, if the UE side stores valid configuration information of the AI target cell, when the first target cell is a cell in the AI target cell, the UE performs a handover procedure to the first target cell. For example, that the UE performs a handover procedure to the first target cell includes: The UE sends an RRC reconfiguration complete message to the first target cell, or when the first target cell is not a cell in the AI target cell, the UE performs a reestablishment procedure to the first target cell. Alternatively, in another design, if the UE does not store valid configuration information of the AI target cell, the UE performs a reestablishment procedure to the first target cell.

Optionally, whether the UE side stores valid configuration information of the AI target cell is described as follows: In Step 606, the source base station sends the configuration information of the AI target cell to the UE. The configuration information of the AI target cell includes expiration time information, and the expiration time information indicates a latest moment at which the UE accesses the AI target cell, or indicates latest valid time of the configuration information of the AI target cell. If the UE has not accessed the AI target cell after the latest moment, the UE may delete the configuration information of the AI target cell. If the UE side stores the configuration information of the AI target cell before the time indicated by the expiration time information, it may be considered that the UE side stores the valid configuration information of the AI target cell; otherwise, it is considered that the UE side does not store the valid configuration information of the AI target cell.

For example, after the UE successfully performs handover to the second cell, after a period of time, the time indicated by the expiration time information expires, and the UE may delete the configuration information that is of the AI target cell and that corresponds to the expiration time information. Then, if the UE detects that the connection to the second cell fails, and the UE does not store the valid configuration information of the AI target cell, the UE may perform a reestablishment procedure to the first target cell.

Step 610: A base station corresponding to the first target cell sends, to the source base station, indication information indicating that the handover succeeds.

Step 611: The source base station sends a second status transfer message to the base station corresponding to the first target cell.

Step 612: The base station corresponding to the first target cell indicates the source base station to release a context of the UE.

Signaling interaction in the handover procedure is much simpler than that in the reestablishment procedure. Therefore, in a process in which the connection between UE and the second cell fails, if the first target cell selected by the UE is a cell in the predicted AI target cell, the UE may directly initiate a handover procedure to the first target cell, to quickly restore a connection, shorten a data transmission interruption latency, and reduce signaling overheads.

Figure 7:
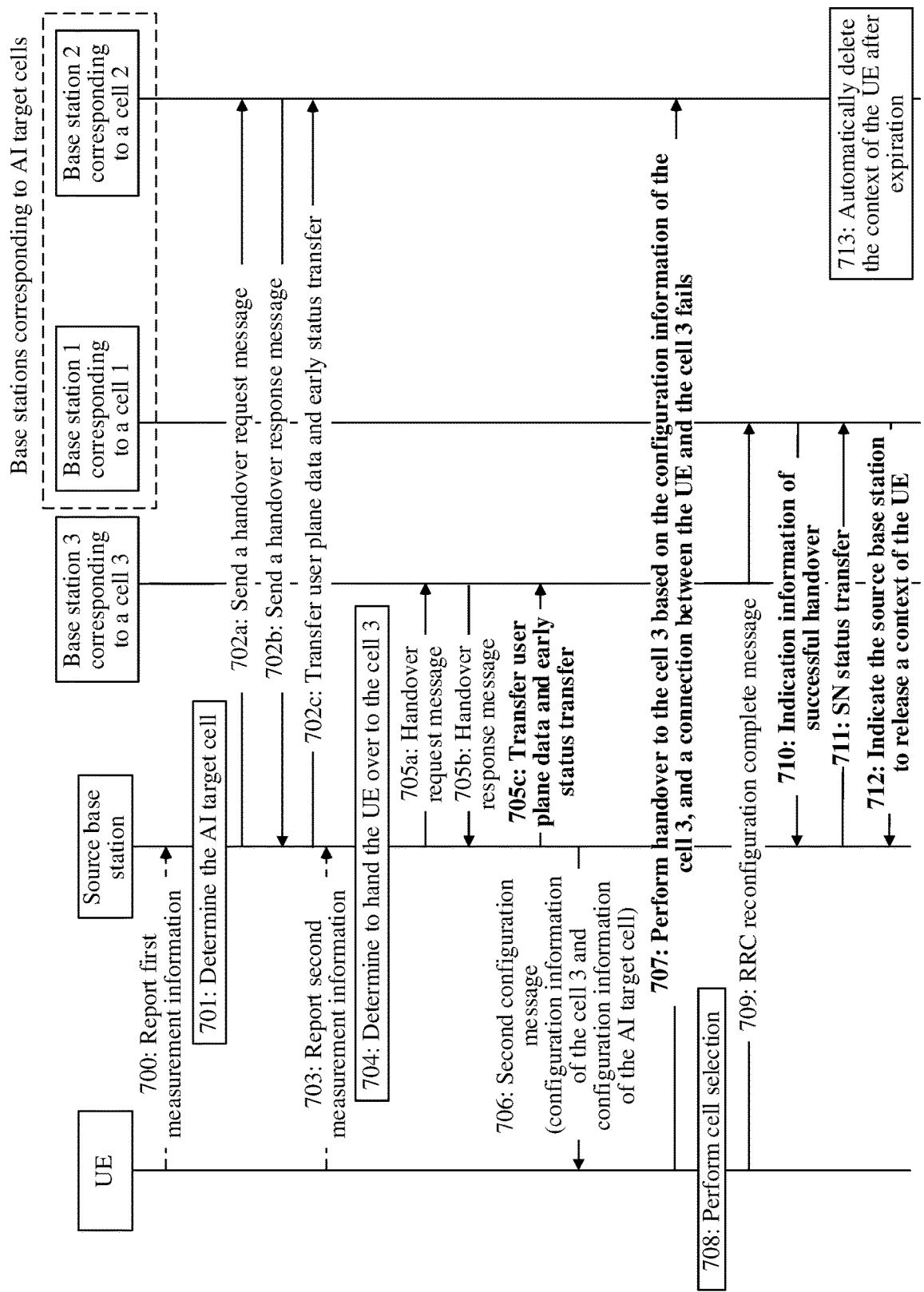
FIG. 7 is another flowchart of cell handover according to Embodiment 2 of this application.

As shown in FIG. 7, an example cell handover procedure is provided, and includes at least the following steps.

Optionally, step 700: UE reports first measurement information to a source base station.

Step 701: The UE determines AI target cell through AI inference, where the AI target cell includes a cell 1 and a cell 2.

Step 702a: The UE separately sends a handover request message to a base station 1 corresponding to the cell 1 and a base station 2 corresponding to the cell 2.

Step 702b: The UE receives handover response messages from the base station 1 and the base station 2.

Step 702c: The source base station transfers user plane data to the base station 1 and the base station 2, and the source base station sends early status transfer to the base station 1 and the base station 2.

Optionally, step 703: The UE sends second measurement information to the source base station.

Step 704: The source base station determines to hand over the UE to a cell 3. In a design, the source base station may determine, based on the second measurement information, to hand over the UE to the cell 3, and the cell 3 does not belong to the AI target cell.

Step 705a: The source base station sends a handover request message to a base station 3 corresponding to the cell 3.

Step 705b: The base station 3 sends a handover request response message to the source base station.

Step 705c: The source base station transfers the user plane data to the base station 3, and the source base station sends early status transfer to the base station 3.

Step 706: The source base station sends a second configuration message to the UE, where the second configuration message may be an RRC reconfiguration message, and the second configuration message indicates configuration information of the cell 3 and configuration information of the AI target cell.

Step 707: The UE performs handover to the cell 3, and detects a connection failure during handover, or detects a connection failure after the UE is handed over to the cell 3.

Step 708: The UE performs cell selection.

Step 709: The UE selects an AI target cell, for example, the cell 1, and performs a handover procedure. In a design, that the UE performs a handover procedure includes: The UE sends an RRC reconfiguration complete message to the base station 1 corresponding to the cell 1.

Step 710: The base station 1 sends handover indication information, for example, a handover success message, to the source base station, to notify the source base station that the UE is successfully handed over to the cell 1.

Step 711: The source base station may send SN status transfer to the base station 1.

Step 712: The base station 1 indicates the source base station to release a context of the UE.

Step 713: The base station 2 corresponding to the cell 2 automatically deletes a context of the UE after expiration. If there is data, the base station 2 also deletes the data corresponding to the UE.

According to the foregoing solution, an AI technology is combined with mobility, so that when a final handover cell obtained based on AI mobility mechanism prediction does not belong to the AI target cell, the configuration information of the AI target cell is still sent to the UE. This can improve mobility robustness. In addition, time information such as activation time information or expiration time information of the AI target cell is introduced, so that resources of the base station corresponding to the AI target cell can be occupied as few as possible, to improve system efficiency.

It may be understood that, in the foregoing description of Embodiment 1 and Embodiment 2, handover triggered by a base station is used as an example for description. Actually, the solution of Embodiment 1 or Embodiment 2 may also be applied to a scenario in which handover is triggered by the UE. In a design, this design mainly has the following differences from FIG. 4 in Embodiment 1 or FIG. 6 in Embodiment 2:

In step 402a or 602a: The first request message sent by the source base station to the target base station corresponding to the AI target cell may further carry indication information for triggering a handover mechanism by the UE.

After step 402c or step 602c, a new step is added: The source base station sends third configuration information to the UE, where the third configuration information indicates the configuration information of the AI target cell and handover trigger configuration information to the UE, and the handover trigger configuration information indicates, to the UE, a trigger condition for handover to the AI target cell. Optionally, the configuration information may further include indication information such as the activation time information and/or the expiration time information of the AI target cell.

The foregoing handover trigger configuration information is described as follows: In a handover mechanism triggered by the UE, the source base station configures at least one candidate cell for the UE. In this example, the AI target cell is a candidate cell configured by the source base station for the UE. When the UE determines that a trigger condition is met, the UE may select a candidate cell corresponding to the trigger condition, and perform handover. The handover trigger configuration information may be specifically: a handover trigger condition configured by the source base station for the candidate cell, that is, the AI target cell. Handover trigger conditions of different candidate cells may be the same or different.

Step 404 or 604 is replaced by: The source base station determines to update the configuration information of the AI target cell and/or update the handover trigger configuration information.

Step 405 or 605 is replaced by: The source base station sends fourth configuration information to the UE, where the fourth configuration information indicates updated configuration information of the AI target cell and/or updated handover trigger configuration information to the UE.

In a design, the UE reports first measurement information to the source base station, and the source base station determines, based on information such as the first measurement information, that the AI target cell includes the cell 1 and the cell 2. The source base station sends third configuration information to the UE, where the third configuration information includes configuration information of the cell 1 and the cell 2, and handover trigger configuration information of the cell 1 and the cell 2. Subsequently, the UE reports second measurement information to the source base station, and the source base station determines, based on the second measurement information, to add a cell 3 as a candidate cell. The source base station may send updated third configuration information, that is, fourth configuration information, to the UE. The fourth configuration information includes configuration information of the cell 1, the cell 2, and the cell 3, and handover trigger configuration information corresponding to the cell 1, the cell 2, or the cell 3. Alternatively, the fourth configuration information may include only configuration information of the cell 3, handover trigger configuration information corresponding to the cell 3, and the like. Further, the fourth configuration information may further include indication information of activation time information, expiration time information of the cell 3, and/or the like.

Embodiment 3

Embodiment 3 provides a cell handover method. The cell handover method may update a result of the AI target cell inferred in Embodiment 1 or Embodiment 2. Embodiment 3 may be used in combination with Embodiment 1 or Embodiment 2, or may be used alone. This is not limited.

The cell handover method provided in Embodiment 3 includes: A source base station outputs fifth configuration information, where the fifth configuration information indicates a trigger condition for reporting first feedback information by UE. The source base station obtains the first feedback information of the UE. The source base station determines an update result of an AI target cell, where the update result of the AI target cell is an updated serving cell to which the UE can be handed over. The foregoing process is described as follows:

In a design, an AI device may be separately deployed. For description of the separately deployed AI device, refer to Embodiment 1. In a possible implementation, the AI device may determine the trigger condition for reporting the first feedback information by the UE, and the AI device sends the fifth configuration information to the source base station. The source base station forwards the fifth configuration information to the UE, to indicate the trigger condition for reporting the first feedback information by the UE. The source base station receives the first feedback information from the UE, and the source base station forwards the first feedback information to the AI device. The AI device updates a result of the AI target cell based on the first feedback information. Alternatively, in another possible implementation, the AI device may directly interact with the UE without forwarding by the source base station. For example, the AI device may directly send the fifth configuration information to the UE, and the UE also directly reports the first feedback information to the AI device.

In another design, a function of an AI module may be integrated into the source base station. For example, the source base station may send the fifth configuration information to the UE. The source base station may receive the first feedback information sent by the UE, and the source base station may update a result of the AI target cell based on the first feedback information.

Figure 8:
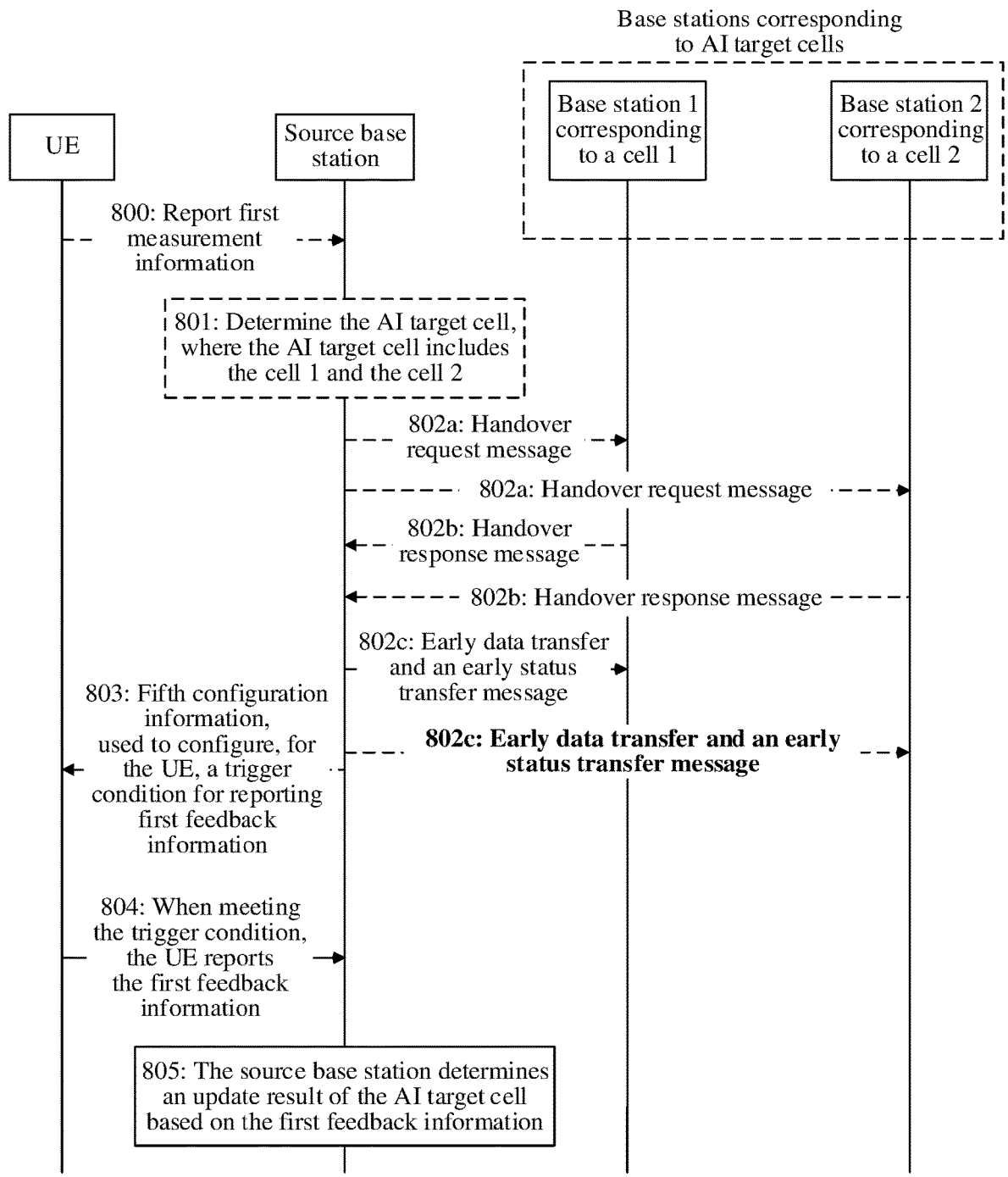
FIG. 8 is a flowchart of cell handover according to Embodiment 3 of this application.

As shown in FIG. 8, an example in which a function of the AI module is integrated into the source base station is used to provide a cell handover procedure, and the procedure includes at least the following steps.

Step 800: The UE sends first measurement information to the source base station.

Step 801: The source base station determines the AI target cell. For example, the AI target cell includes a cell 1 and a cell 2, a base station corresponding to the cell 1 is a base station 1, and a base station corresponding to the cell 2 is a base station 2.

Step 802*a*: The source base station separately sends a handover request message to the base station 1 and the base station 2.

Step 802*b*: The base station 1 and the base station 2 each send a handover request response message to the source base station.

Step 802*c*: The source base station early transfers user plane data and sends an early status transfer message to the base station 1 and the base station 2.

Steps 800 to 802*c* are optional. The reason is as follows: When a condition of Steps 800 to 802*c* is met, the source base station may perform Step 803 to send the fifth configuration information to the UE. Alternatively, the source base station may use another condition as a trigger to perform Step 803 to send the fifth configuration information to the UE, and the like. This is not limited.

Step 803: The source base station sends the fifth configuration information to the UE, where the fifth configuration indicates a trigger condition for reporting the first feedback information by the UE. In a design, the source base station may send an RRC reconfiguration message to the UE. The RRC reconfiguration message includes the fifth configuration information.

For example, the fifth configuration information may indicate at least one of the following:

Identification information of at least one cell and quality threshold information: The identification information of the cell may be identification information of a serving cell of the UE and/or identification information of a neighboring cell. The neighboring cell may be an AI target cell. The quality threshold information is used by the UE to report the first feedback information when the UE determines that quality of a cell meets a quality threshold. In a specific example, the quality threshold information may be first quality threshold information. When the UE determines that signal quality of the cell is lower than or equal to a first quality threshold, the UE may report the first feedback information. Alternatively, the threshold information may include second quality threshold information and third quality threshold information. When quality of a current serving cell of the UE is lower than or equal to a second quality threshold, and the quality of the neighboring cell is higher than or equal to a third quality threshold, the UE may report the first feedback information. It may be understood that, in this case, the first feedback information may include identification information of a cell that meets the fifth configuration information, quality information corresponding to the identification information of the cell that meets the fifth configuration information, and/or the like.

Reference location information and first distance threshold information: For example, when a distance between a latest location of the UE and a reference location is greater than or equal to a first distance threshold, the UE reports the first feedback information. It may be understood that the first feedback information may include latest location information of the UE.

Time reporting indication information, indicating the UE to use the first feedback information to carry time information or not to use the first feedback information to carry time information. The time information is a moment at which the UE meets the fifth configuration information, a moment at which the UE reports the first feedback information, or the like.

Track change trigger information, indicating that the UE reports the first feedback information when a latest track of the UE deviates from a previous track. For example, the previous track of the UE obtained by the base station is A. When the UE finds that the UE deviates from the previous track A, or when a distance or time for which the UE deviates from the previous track A exceeds a threshold, the UE sends the first feedback information to the base station.

Step 804: When meeting the trigger condition, the UE reports the first feedback information to the source base station.

Step 805: The source base station determines an update result of the AI target cell based on the first feedback information.

In a design, the source base station may use the first feedback information as an input, and input the first feedback information to an AI model. An output of the AI model is the update result of the AI target cell. Alternatively, the source base station may update the AI model based on the first feedback information, and obtain the update result of the AI target cell by using an updated AI model.

According to the foregoing solution, the UE performs AI inference feedback, so that the source base station can improve an AI inference result in a timely manner, to ensure accuracy and effectiveness of the AI inference result.

For Embodiment 1 to Embodiment 3, it should be noted that:

1. The foregoing focuses on differences between Embodiment 1, Embodiment 2, and Embodiment 3. For content other than the differences, reference may be made to each other.

2. Not all the steps illustrated in the flowcharts described in Embodiment 1 to Embodiment 3 are mandatory steps, and some steps may be added or deleted based on the flowcharts according to an actual requirement. For example, step 400 and steps 800 to 802c may be selectively performed.

3. In the description of Embodiment 1 to Embodiment 3, a hardware device as a whole is used as an example for description, and actions of internal modules of the hardware device are not described. To support the hardware device as a whole and implement the related functions described in the foregoing embodiments, operations between internal modules of the hardware device also fall within the protection scope of embodiments of this application.

For example, in a design, with the introduction of an open radio access network (O-RAN), a function of an access network device may be implemented by a plurality of common standard modules. As shown in FIG. 2b, a function of the base station may be implemented by a CU module or a DU module. For example, in Embodiment 1, describe as a whole, actions of the source base station and the target base station may be as follows: The source base station determines the AI target cell, and the source base station sends the first request message to the target base station corresponding to the AI target cell. The target base station sends the first response message to the source base station, where the first response message is in response to the first request message.

If the source base station includes a CU1 module and a DU1 module, the target base station includes a CU2 module and a DU2 module. A transmission path of the first request message may include: The CU1 module may determine the AI target cell, and the CU1 module sends the first request message to the CU2 module. If the AI target cell is a cell managed by the DU2, the CU2 module may send the second request message to the DU2 module. Content and functions of the second request message are similar to those of the first request message. A transmission path of the first response message may include: The DU2 module sends the second response message to the CU2 module, where the second response message is in response to the first response message. The CU2 generates the first response message with reference to a notification (that is, the second response message) of the DU2 and determining of the CU2, and the CU2 sends the first response message to the CU1.

4. In the foregoing description of Embodiment 1 to Embodiment 3, the following description is used: "A device outputs a message", for example, the source base station outputs the first request message, and the source base station outputs the fifth configuration information. In the description of this application, "a device outputs a message (for ease of differentiation, one of the foregoing messages may be referred to as a message A below)" may include: "the device sends the message A to another device", or "a module in the device outputs the message A to another module in the device, and the other module sends the message A to another device".

"A device obtains a message of another device", for example, the source base station obtains the first feedback information of the UE, and the source base station obtains the first response message of the target base station. In the description of this application, "a device obtains a message of another device" may be "the device receives a message of another device", or "a module in the device receives a message of another device, and the module in the device forwards the received message to another module in the device".

5. In the description of Embodiment 1 to Embodiment 3, the description that "a message includes indication information of specific information" is used. For example, the first request message may include indication information of at least one piece of information. The foregoing description is described as follows: The message may directly indicate corresponding information. For example, the message directly carries the information. Alternatively, the message may indirectly indicate corresponding information. For example, the message carries indication information of corresponding information. For example, a message A includes indication information of information X, and the message A may directly indicate the information X. For example, the message A may carry the information X. Alternatively, the message A may indirectly indicate the information X. For example, the message A may carry other information used to indicate the information X.

6. For ease of understanding, in the description of Embodiment 1 to Embodiment 3, names such as the source base station, the target base station, and the UE are directly used. It may be understood that the source base station is a network device to which a serving cell of the UE belongs, and may be referred to as a first network device; the target base station may be a network device to which an AI target cell belongs, and may be referred to as a second network device; and the UE may be a terminal device of a serving cell to which handover is to be performed. For description of the network device and the terminal device, refer to the description in FIG. 1.

The foregoing describes in detail the methods provided in embodiments of this application with reference to FIG. 1, FIG. 2a to FIG. 2d, FIG. 3a to FIG. 3d, and FIG. 4 to FIG. 8. The following describes in detail apparatuses provided in embodiments of this application with reference to FIG. 9 to FIG. 11. It should be understood that the description of the apparatus embodiments corresponds to the description of the method embodiments. Therefore, for content that is not described in detail, refer to the description in the method embodiments.

Figure 9:
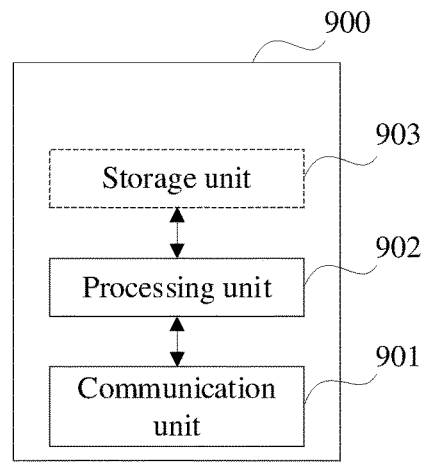
FIG. 9 is a schematic diagram of a structure of an apparatus according to an embodiment of this application.

FIG. 9 is a possible block diagram of an apparatus according to an embodiment of this application. As shown in FIG. 9, the apparatus 900 may include: a communication unit 901, configured to support communication between the apparatus and another device, where optionally, the communication unit 901 is also referred to as a transceiver unit, and may include a receiving unit and/or a sending unit, configured to perform a receiving operation and a sending operation respectively; and a processing unit 902, configured to support the apparatus in performing processing. Optionally, the apparatus 900 may further include a storage unit 903, configured to store program code and/or data of the apparatus 900.

In a first embodiment, the apparatus 900 may be a network device or a module, a chip, or a circuit in the network device. The communication unit 901 is configured to perform sending and receiving operations of the source base station in the method Embodiment 1 or Embodiment 2. The processing unit 902 is configured to perform processing-related operations of the source base station in the method Embodiment 1 or Embodiment 2.

For example, the processing unit 902 is configured to determine an AI target cell, where the AI target cell is a predicted serving cell to which a terminal device can be handed over. The communication unit 901 is configured to output a first request message, where the first request message is used to request a second network device corresponding to the AI target cell to allocate, to the terminal device, a resource corresponding to the AI target cell, and the first request message indicates at least one of the following: identification information of the AI target cell, a type of the handover being AI handover, activation time information, expiration time information, or prediction accuracy of the AI target cell, where the activation time information indicates an earliest moment at which the terminal device is handed over to the AI target cell, and the expiration time information indicates a latest moment at which the terminal device is handed over to the AI target cell.

In a possible design, that the AI target cell is predicted in an AI manner includes: The AI target cell is predicted based on at least one piece of the following information, where the at least one piece of information includes: first measurement information of the terminal device, load information of a serving cell, load information of a neighboring cell, track information of the terminal device, geographical coordinate information of the terminal device, a movement direction of the terminal device, or a movement speed of the terminal device.

In a possible design, the communication unit 901 is further configured to obtain a first response message of a second network device, where the first response message is in response to the first request message, and the first response message includes indication information indicating a quantity of cells that are served by the second network device and to which the terminal device is allowed to perform AI handover.

In a possible design, the communication unit 901 is further configured to: obtain AI information of the second network device, where the AI information indicates at least one of the following: indication information indicating whether the second network device supports or does not support AI handover, indication information indicating an AI handover type supported by the second network device, or information about a cell that is served by the second network device and that allows AI handover.

In a possible design, the communication unit 901 is further configured to: transfer user plane data of the terminal device to the second network device, and output a first status transfer message, where the first status transfer message indicates a number of a first downlink service data unit SDU in the user plane data transferred by the first network device to the second network device, and/or a number of an SDU that can be discarded in the transferred user plane data.

In a possible design, the processing unit 902 is further configured to determine to hand over the terminal device to a first cell in the AI target cell. The communication unit 901 is further configured to output a first configuration message, where the first configuration message indicates configuration information of the first cell to the terminal device.

In a possible design, the processing unit 902 is further configured to determine to hand over the terminal device to a second cell, where the AI target cell does not include the second cell. The communication unit 901 is further configured to output a second configuration message, where the second configuration message indicates configuration information of the second cell and configuration information of the AI target cell to the terminal device.

In a possible design, the communication unit 901 is further configured to output third configuration information, where the third configuration information indicates configuration information of the AI target cell and handover trigger configuration information to the terminal device, and the handover trigger configuration information indicates, to the terminal device, a trigger condition for handover to the AI target cell.

In a possible design, the processing unit 902 is further configured to determine to update the configuration information of the AI target cell, and/or update the handover trigger configuration information. The communication unit 901 is configured to output fourth configuration information, where the fourth configuration information indicates updated configuration information of the AI target cell and/or updated handover trigger configuration information to the terminal device.

In a possible design, the configuration information of the AI target cell indicates at least one of the following: the identification information of the AI target cell, random access information, the activation time information, or the expiration time information, where the random access information indicates a random access resource on which the terminal device is handed over to the AI target cell, the activation time information indicates an earliest moment at which the terminal device is handed over to the AI target cell, and the expiration time information indicates a latest moment at which the terminal device is handed over to the AI target cell.

In a second embodiment, the apparatus 900 may be a network device or a module, a chip, or a circuit in the network device. The communication unit 901 is configured to perform sending and receiving-related operations of the target base station in the method Embodiment 1 or Embodiment 2. The processing unit 902 is configured to perform processing-related operations of the target base station in the method Embodiment 1 or Embodiment 2.

For example, the communication unit 901 is configured to obtain a first request message of a first network device, where the first request message is used to request a second network device corresponding to an artificial intelligence AI target cell to allocate, to a terminal device, a resource corresponding to the AI target cell. The first request message indicates at least one of the following: identification information of the AI target cell, a type of the handover being AI handover, activation time information, expiration time information, or prediction accuracy of the AI target cell, where the activation time information indicates an earliest moment at which the terminal device is handed over to the AI target cell, and the expiration time information indicates a latest moment at which the terminal device is handed over to the AI target cell.

In a possible design, the AI target cell is predicted based on at least one piece of the following information, where the at least one piece of information includes: first measurement information of the terminal device, load information of a serving cell, load information of a neighboring cell, track information of the terminal device, geographical coordinate information of the terminal device, a movement direction of the terminal device, or a movement speed of the terminal device.

In a possible design, the communication unit 901 is further configured to: output a first response message, where the first response message is in response to the first request message, and the first response message includes indication information indicating a quantity of cells that are served by the second network device and to which the terminal device is allowed to perform AI handover.

In a possible design, the communication unit 901 is further configured to: output an AI message, where the AI information indicates at least one of the following: indication information indicating whether the second network device supports or does not support AI handover, indication information indicating an AI handover type supported by the second network device, or information about a cell that is served by the second network device and that allows AI handover.

In a possible design, the communication unit 901 is further configured to: obtain user plane data of the terminal device transferred by the first network device, and obtain a first status transfer message of the first network device, where the first status transfer message indicates a number of a first downlink service data unit SDU in the user plane data transferred by the first network device to the second network device, and/or a number of an SDU that can be discarded in the transferred user plane data.

In a third embodiment, the apparatus 900 may be a terminal device or a module, a chip, or a circuit in the terminal device. The communication unit 901 is configured to perform sending and receiving-related operations of the UE in the method Embodiment 2. The processing unit 902 is configured to perform processing-related operations of the UE in the foregoing method embodiments.

The communication unit 901 is configured to obtain second configuration information of a first network device, where the second configuration information indicates configuration information of a second cell and configuration information of an artificial intelligence AI target cell to a terminal device. The processing unit 902 is configured to perform handover to the second cell based on the configuration information of the second cell.

In a possible design, the processing unit 902 is further configured to determine a first target cell when the terminal device fails to connect to the second cell.

In a possible design, if the terminal device side stores valid configuration information of the AI target cell, the processing unit 902 is further configured to: when the first target cell is a cell in the AI target cell, perform a handover procedure to the first target cell; or when the first target cell is not a cell in the AI target cell, perform a reestablishment procedure to the first target cell.

In a possible design, if the terminal device side does not store valid configuration information of the AI target cell, the processing unit 902 is further configured to perform a reestablishment procedure to the first target cell.

In a fourth embodiment, the apparatus 900 may be a network device or a module, a chip, or a circuit in the network device. The communication unit 901 is configured to perform sending and receiving-related operations of the source base station in the method Embodiment 3. The processing unit 902 is configured to perform processing-related operations of the source base station in the method Embodiment 3.

For example, the communication unit 901 is configured to output fifth configuration information, where the fifth configuration information indicates a trigger condition for reporting first feedback information by a terminal device. The communication unit 901 is further configured to obtain the first feedback information of the terminal device.

The processing unit 902 is configured to determine an update result of an artificial intelligence AI target cell, where the update result of the AI target cell is determined based on the first feedback information, and the update result of the AI target cell is an updated serving cell to which the terminal device can be handed over.

In a possible design, the fifth configuration information indicates at least one of the following: information and quality threshold information of at least one cell, reference location information, first distance threshold information, track change trigger information, or time reporting indication information, where the time reporting indication information includes indication information indicating that the terminal device uses the first feedback information to carry time information or does not use the first feedback information to carry time information, and the time information is a moment at which the terminal device meets the fifth configuration information, or a moment at which the terminal device reports the first feedback information.

In a possible design, when the fifth configuration information indicates identification information and quality threshold information of at least one cell, the first feedback information indicates identification information of a cell that meets the fifth configuration information, and/or quality information of a cell that meets the fifth configuration information; or the first feedback information indicates identification information of a cell that does not meet the fifth configuration information, and/or quality information of a cell that does not meet the fifth configuration information; or when the fifth configuration information indicates the reference location information and the first distance threshold information, the first feedback information indicates latest location information of the terminal device.

In a fifth embodiment, the apparatus 900 may be a terminal device or a module, a chip, or a circuit in the terminal device. The communication unit 901 is configured to perform sending and receiving-related operations of the UE in the method Embodiment 3. The processing unit 902 is configured to perform processing-related operations of the UE in the method Embodiment 3.

For example, the communication unit 901 is configured to obtain fifth configuration information of a first network device, where the fifth configuration information indicates a trigger condition for reporting first feedback information by a terminal device. The communication unit 901 is further configured to output the first feedback information, where the first feedback information is output when the trigger condition of the fifth configuration information is met, the first feedback information is used to update an artificial intelligence AI target cell, and an update result of the AI target cell is an updated serving cell to which the terminal device can be handed over.

In a possible design, the fifth configuration information indicates at least one of the following: information and quality threshold information of at least one cell, reference location information, first distance threshold information, track change trigger information, or time reporting indication information, where the time reporting indication information includes indication information indicating that the terminal device uses the first feedback information to carry time information or does not use the first feedback information to carry time information, and the time information is a moment at which the terminal device meets the fifth configuration information, or a moment at which the terminal device reports the first feedback information.

In a possible design, when the fifth configuration information indicates identification information and quality threshold information of at least one cell, the first feedback information indicates identification information of a cell that meets the fifth configuration information, and/or quality information of a cell that meets the fifth configuration information; or the first feedback information indicates identification information of a cell that does not meet the fifth configuration information, and/or quality information of a cell that does not meet the fifth configuration information; or when the fifth configuration information indicates the reference location information and the first distance threshold information, the first feedback information indicates latest location information of the terminal device.

It should be understood that division into units in the apparatus is merely logical function division actual implementation, all or some of the units may be integrated into one physical entity or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated together, or may be implemented independently. The processing element herein may also be referred to as a processor, and may be an integrated circuit having a signal processing capability. In an implementation process, operations in the foregoing methods or the foregoing units may be implemented by using a hardware integrated logic circuit in the processor element or may be implemented in a form in which the processing element invokes software.

In an example, a unit in any one of the foregoing apparatuses may be one or more integrated circuits configured to implement the foregoing methods, for example, one or more application-specific integrated circuits (ASIC), one or more microprocessors (DSP), one or more field programmable gate arrays (FPGA), or a combination of at least two of these forms of integrated circuits. For another example, when the units in the apparatus may be implemented in a form in which a processing element schedules a program, the processing element may be a processor, for example, a general-purpose central processing unit (CPU) or another processor that can invoke the program. For still another example, the units may be integrated and implemented in a form of a system-on-a-chip (SOC).

The foregoing unit configured for receiving is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing unit configured for sending is an interface circuit of the apparatus, and is configured to send a signal to another apparatus. For example, when the apparatus is implemented in the manner of the chip, the sending unit is an interface circuit that is of the chip and that is configured to send a signal to another chip or apparatus.

Figure 10:
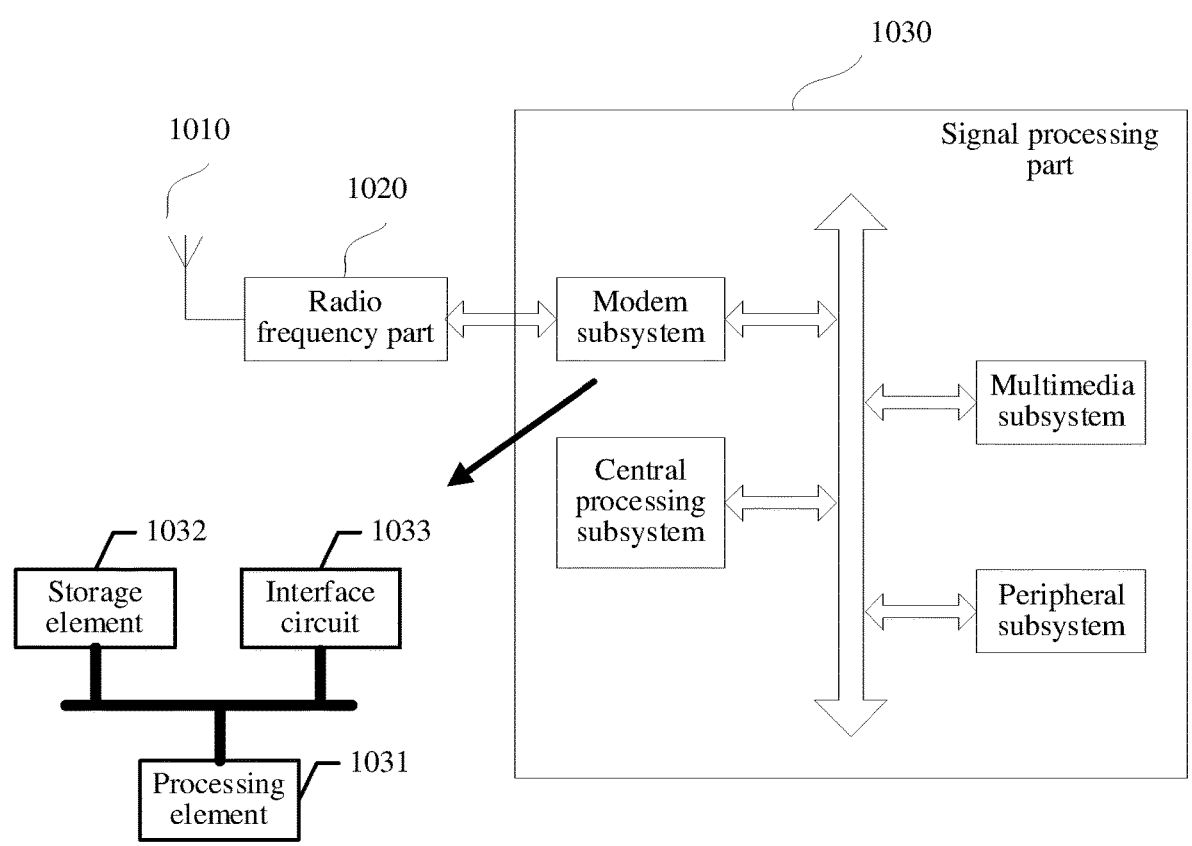
FIG. 10 is a schematic diagram of a structure of a terminal device according to an embodiment of this application.

FIG. 10 is a schematic diagram of a structure of a terminal device according to an embodiment of this application. As shown in FIG. 10, the terminal device includes: an antenna 1010, a radio frequency part 1020, and a signal processing part 1030. The antenna 1010 is connected to the radio frequency part 1020. In a downlink direction, the radio frequency part 1020 receives, through the antenna 1010, information sent by a network device; and sends, to the signal processing part 1030 for processing, the information sent by the network device. In an uplink direction, the signal processing part 1030 processes the information of the terminal device, and sends the processed information to the radio frequency part 1020; and the radio frequency part 1020 processes the information of the terminal device, and then sends the processed information to the network device through the antenna 1010.

The signal processing part 1030 may include a modem subsystem, configured to process data at each communication protocol layer. The signal processing part 1030 may further include a central processing subsystem, configured to process an operating system and an application layer that are of the terminal device. In addition, the signal processing part 1030 may further include another subsystem, for example, a multimedia subsystem, or a peripheral subsystem. The multimedia subsystem is configured to control a camera or a screen display of the terminal device. The peripheral subsystem is configured to connect to another device. The modem subsystem may be a separately disposed chip.

The modem subsystem may include one or more processing elements 1031, for example, include a main control CPU and another integrated circuit. In addition, the modem subsystem may further include a storage element 1032 and an interface circuit 1033. The storage element 1032 is configured to store data and a program. However, a program used to perform the methods performed by the terminal device in the foregoing methods may not be stored in the storage element 1032, but is stored in a memory outside the modem subsystem, and is loaded and used by the modem subsystem when to be used. The interface circuit 1033 is configured to communicate with another subsystem.

The modem subsystem may be implemented by using a chip. The chip includes at least one processing element and an interface circuit. The processing element is configured to perform the steps of any method performed by the terminal device. The interface circuit is configured to communicate with another apparatus. In an implementation, units of the terminal device that implement the steps in the foregoing methods may be implemented by a program scheduled by a processing element. For example, the apparatus used for the terminal device includes a processing element and a storage element. The processing element invokes a program stored in the storage element, to perform the method performed by the terminal device in the foregoing method embodiment. The storage element may be a storage element whose processing element is located on a same chip, that is, an on-chip storage element.

In another implementation, the program used to perform the method performed by the terminal device in the foregoing method may be in a storage element located on a different chip from the processing element, that is, an off-chip storage element. In this case, the processing element invokes or loads the program from the off-chip storage element to the on-chip storage element, to invoke and perform the method performed by the terminal device in the foregoing method embodiment.

In still another implementation, units of the terminal device that implement the steps in the foregoing method may be configured as one or more processing elements. The processing elements are disposed in the modem subsystem. The processing element herein may be an integrated circuit, for example, one or more ASICs, one or more DSPs, one or more FPGAs, or a combination of the types of integrated circuits. These integrated circuits may be integrated together to form a chip.

Units of the terminal device that implement the steps in the foregoing method may be integrated together, and implemented in a form of SOC. The SOC chip is configured to implement the foregoing method. At least one processing element and a storage element may be integrated into the chip, and the processing element invokes a program stored in the storage element to implement the foregoing method performed by the terminal device. Alternatively, at least one integrated circuit may be integrated into the chip, to implement the foregoing method performed by the terminal device. Alternatively, with reference to the foregoing implementations, functions of some units may be implemented by a program invoked by the processing element, and functions of some units are implemented by the integrated circuit.

It can be learned that the foregoing apparatus used for the terminal device may include at least one processing element and an interface circuit. The at least one processing element is configured to perform any one of the methods that are performed by the terminal device and that are provided in the foregoing method embodiments. The processing element may perform some or all steps performed by the terminal device, in a first manner, to be specific, by invoking the program stored in the storage element; or may perform some or all steps performed by the terminal device, in a second manner, to be specific, by using a hardware integrated logical circuit in the processor element in combination with instructions; or may certainly perform, by combining the first manner and the second manner, some or all steps performed by the terminal device.

The processing element herein is the same as that described above, and may be implemented by using a processor. A function of the processing element may be the same as a function of the processing unit described in FIG. 9. For example, the processing element may be a general-purpose processor, for example, a CPU, or may be one or more integrated circuits configured to implement the foregoing method, for example, one or more ASICs, one or more microprocessors DSPs, or one or more FPGAs, or a combination of at least two of the integrated circuit forms. The storage element may be implemented by using a memory. A function of the storage element may be the same as a function of the storage unit described in FIG. 9. The storage element may be a memory, or may be a general name of a plurality of memories.

The terminal device shown in FIG. 10 can implement all processes related to the terminal device in the foregoing method embodiments. Operations and/or functions of the modules in the terminal device shown in FIG. 10 are intended to implement the corresponding procedures in the foregoing method embodiments. For details, refer to the description in the foregoing method embodiment. To avoid repetition, detailed descriptions are properly omitted herein.

Figure 11:
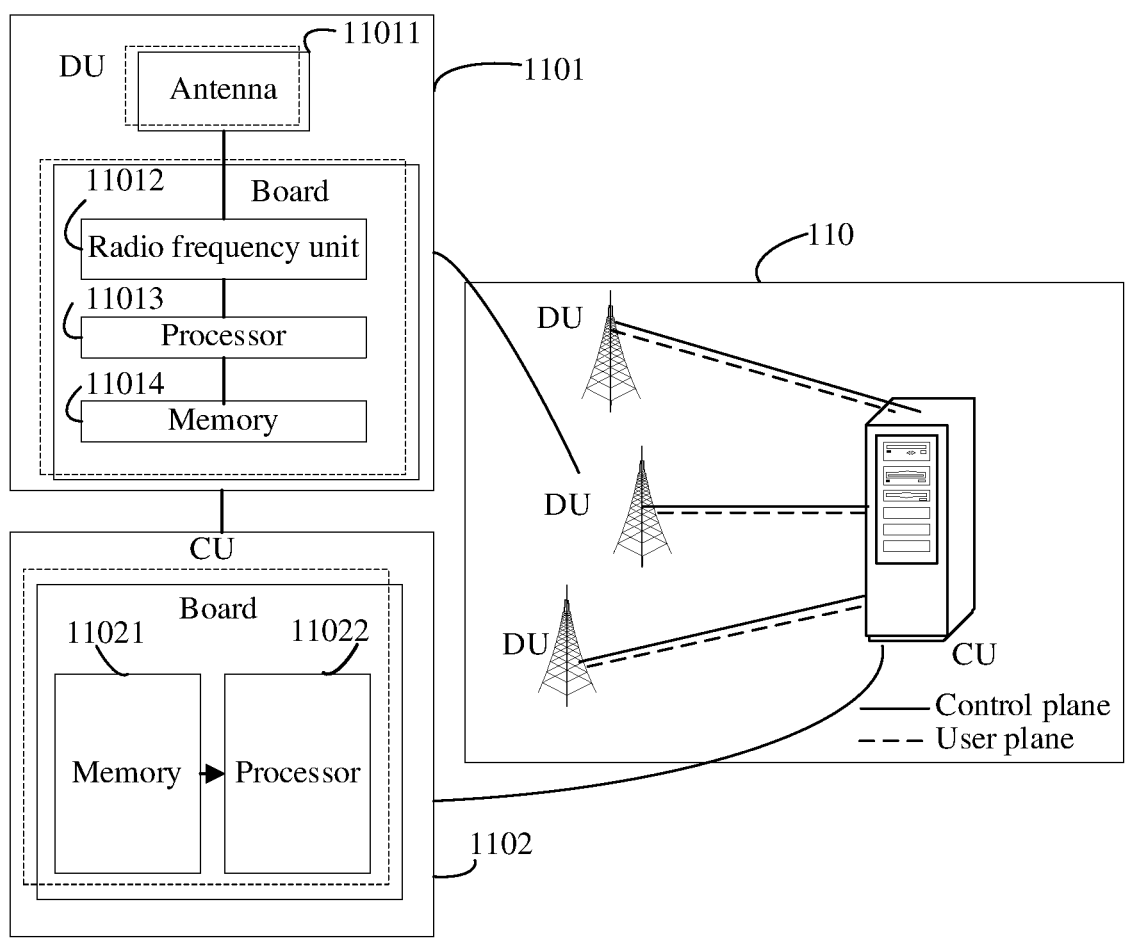
FIG. 11 is a schematic diagram of a structure of a network device according to an embodiment of this application.

FIG. 11 is a schematic diagram of a structure of a network device according to an embodiment of this application. The network device may be an access network device (for example, a base station). The access network device 110 may include one or more DUs 1101 and one or more CUs 1102. The DU 1101 may include at least one antenna 11011, at least one radio frequency unit 11012, at least one processor 11013, and at least one memory 11014. The DU 1101 is mainly configured to receive and send a radio frequency signal, perform conversion between a radio frequency signal and a baseband signal, and perform partial baseband processing. The CU 1102 may include at least one processor 11022 and at least one memory 11021.

The CU 1102 is mainly configured to: perform baseband processing, control an access network device, and so on. The DU 1101 and the CU 1102 may be physically disposed together, or may be physically disposed separately, namely, a distributed base station. The CU 1102 is a control center of the access network device, may also be referred to as a processing unit, and is mainly configured to complete a baseband processing function. For example, the CU 1102 may be configured to control the access network device to perform an operation procedure related to the access network device in the foregoing method embodiments.

In addition, optionally, the access network device 110 may include one or more radio frequency units, one or more DUs, and one or more CUs. The DU may include at least one processor 11013 and at least one memory 11014, the radio frequency unit may include at least one antenna 11011 and at least one radio frequency unit 11012, and the CU may include at least one processor 11022 and at least one memory 11021.

In an example, the CU 1102 may include one or more boards. A plurality of boards may jointly support a radio access network (for example, a 5G network) with a single access indication, or may separately support radio access networks (for example, an LTE network, a 5G network, or another network) with different access standards. The memory 11021 and the processor 11022 may serve one or more boards. In other words, a memory and a processor may be deployed on each board. Alternatively, a plurality of boards may share a same memory and a same processor. In addition, a necessary circuit may be further disposed on each board. In an example, the DU 1101 may include one or more boards. A plurality of boards may jointly support a radio access network (for example, a 5G network) with a single access indication, or may separately support radio access networks (for example, an LTE network, a 5G network, or another network) with different access standards. The memory 11014 and the processor 11013 may serve one or more boards. In other words, a memory and a processor may be deployed on each board. Alternatively, a plurality of boards may share a same memory and a same processor. In addition, a necessary circuit may be further disposed on each board.

The access network device shown in FIG. 11 can implement all processes related to the access network device in the foregoing method embodiments. Operations and/or functions of the modules in the access network device shown in FIG. 11 are intended to implement the corresponding procedures in the foregoing method embodiments. For details, refer to the description in the foregoing method embodiment. To avoid repetition, detailed descriptions are properly omitted herein.

The terms "system" and "network" in embodiments of this application may be used interchangeably. "At least one" means one or more, and "a plurality of" means two or more. "And/Or" is an association relationship for describing associated objects, and represents that three relationships may exist. For example, A and/or B may represent the following cases: Only A exists, both A and B exist, and only B exists, where A and B may be in a singular form or a plural form. The character "/" generally indicates that the related objects before and after are in an "or" relationship. At least one of the following items (pieces) or a similar expression thereof refers to any combination of these items, including any combination of singular items (pieces) or plural items (pieces). For example, in A, B, or C contains at least one of A, B, C, AB, AC, BC, or ABC. In addition, unless otherwise specified, ordinal numerals such as "first" and "second" in embodiments of this application are used to distinguish between a plurality of objects, and are not used to limit the sequence, timing, priority, or importance of the plurality of objects.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of another programmable data processing device generate an apparatus for implementing a specific function in one or more processes in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operation steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A cell handover method, comprising:
   determining an artificial intelligence (AI) target cell, wherein the AI target cell is an AI predicted serving cell to which a terminal device can be handed over; and
   outputting a first request message, wherein the first request message is used to request a second network device corresponding to the AI target cell to allocate, to the terminal device, a resource corresponding to the AI target cell, and the first request message indicates at least one of the following: identification information of the AI target cell, a type of the handover being AI handover, activation time information, expiration time information, or prediction accuracy of the AI target cell, wherein the activation time information indicates an earliest moment at which the terminal device shall be handed over to the AI target cell, and wherein the expiration time information indicates a latest moment at which the terminal device shall be handed over to the AI target cell, wherein that the AI target cell is AI predicted comprises:
the AI target cell is predicted based on at least one of: first measurement information of the terminal device, load information of a serving cell, load information of a neighboring cell, track information of the terminal device, geographical coordinate information of the terminal device, a movement direction of the terminal device, or a movement speed of the terminal device, and the method further comprising:
obtaining AI information of the second network device, wherein the AI information indicates at least one of the following: indication information indicating that the second network device supports AI handover, indication information indicating an AI handover type supported by the second network device, or information about a cell that is served by the second network device and that allows AI handover.

2. The method according to claim 1, further comprising:
obtaining a first response message of the second network device, wherein the first response message is in response to the first request message, and the first response message comprises indication information indicating a quantity of cells that are served by the second network device and to which the terminal device is allowed to perform AI handover.

3. The method according to claim 1, further comprising:
transferring user plane data of the terminal device to the second network device; and
outputting a first status transfer message, wherein the first status transfer message indicates a number of a first downlink service data unit (SDU) in the user plane data transferred by the first network device to the second network device, or a number of an SDU that can be discarded in the transferred user plane data.

4. The method according to claim 1, further comprising:
determining to hand over the terminal device to a first cell in the AI target cell; and
outputting a first configuration message, wherein the first configuration message indicates configuration information of the first cell to the terminal device.

5. The method according to claim 1, further comprising:
determining to hand over the terminal device to a second cell, wherein the AI target cell does not comprise the second cell; and
outputting a second configuration message, wherein the second configuration message indicates configuration information of the second cell and configuration information of the AI target cell to the terminal device.

6. An apparatus comprising:
at least one processor, and a memory storing instructions for execution by the at least one processor;
wherein, when executed, the instructions cause the apparatus to perform operations comprising:
determining an artificial intelligence (AI) target cell, wherein the AI target cell is an AI predicted serving cell to which a terminal device can be handed over; and
outputting a first request message, wherein the first request message is used to request a second network device corresponding to the AI target cell to allocate, to the terminal device, a resource corresponding to the AI target cell, and the first request message indicates at least one of the following: identification information of the AI target cell, a type of the handover being AI handover, activation time information, expiration time information, or prediction accuracy of the AI target cell, wherein the activation time information indicates an earliest moment at which the terminal device shall be handed over to the AI target cell, and wherein the expiration time information indicates a latest moment at which the terminal device shall be handed over to the AI target cell, wherein that the AI target cell is AI predicted comprises:
the AI target cell is predicted based on at least one of: first measurement information of the terminal device, load information of a serving cell, load information of a neighboring cell, track information of the terminal device, geographical coordinate information of the terminal device, a movement direction of the terminal device, or a movement speed of the terminal device, and the method further comprising:
obtaining AI information of the second network device, wherein the AI information indicates at least one of the following: indication information indicating that the second network device supports AI handover, indication information indicating an AI handover type supported by the second network device, or information about a cell that is served by the second network device and that allows AI handover.

7. The apparatus according to claim 6, wherein, when executed, the instructions cause the apparatus to perform operations comprising:
obtaining a first response message of the second network device, wherein the first response message is in response to the first request message, and the first response message comprises indication information indicating a quantity of cells that are served by the second network device and to which the terminal device is allowed to perform AI handover.

8. The apparatus according to claim 6, wherein, when executed, the instructions cause the apparatus to perform operations comprising:
transferring user plane data of the terminal device to the second network device; and
outputting a first status transfer message, wherein the first status transfer message indicates a number of a first downlink service data unit (SDU) in the user plane data transferred by the first network device to the second network device, or a number of an SDU that can be discarded in the transferred user plane data.

9. The apparatus according to claim 6, wherein, when executed, the instructions cause the apparatus to perform operations comprising:
determining to hand over the terminal device to a first cell in the AI target cell; and
outputting a first configuration message, wherein the first configuration message indicates configuration information of the first cell to the terminal device.

10. The apparatus according to claim 6, wherein, when executed, the instructions cause the apparatus to perform operations comprising:
determining to hand over the terminal device to a second cell, wherein the AI target cell does not comprise the second cell; and outputting a second configuration message, wherein the second configuration message indicates configuration information of the second cell and configuration information of the AI target cell to the terminal device.

11. An apparatus comprising:
at least one processor, and a memory storing instructions for execution by the at least one processor;
wherein, when executed, the instructions cause the apparatus to perform operations comprising:
obtaining a first request message of a first network device, wherein the first request message requests a second network device corresponding to an artificial intelligence (AI) target cell to allocate, to a terminal device, a resource corresponding to the AI target cell, and
the first request message indicates at least one of the following: identification information of the AI target cell, a type of the handover being AI handover, activation time information, expiration time information, or prediction accuracy of the AI target cell, wherein the activation time information indicates an earliest moment at which the terminal device shall be handed over to the AI target cell, and where the expiration time information indicates a latest moment at which the terminal device shall be handed over to the AI target cell,
wherein the AI target cell is predicted based on at least one piece of the following information, wherein the at least one piece of information comprises: first measurement information of the terminal device, load information of a serving cell, load information of a neighboring cell, track information of the terminal device, geographical coordinate information of the terminal device, a movement direction of the terminal device, or a movement speed of the terminal device, and wherein, when executed, the instructions cause the apparatus to further perform operations comprising:
outputting an AI information, wherein the AI information indicates at least one of the following: indication information indicating that the second network device supports AI handover, indication information indicating an AI handover type supported by the second network device, or information about a cell that is served by the second network device and that allows AI handover.

12. The apparatus according to claim 11, wherein, when executed, the instructions cause the apparatus to further perform operations comprising:
outputting a first response message, wherein the first response message is in response to the first request message, and the first response message comprises indication information indicating a quantity of cells that are served by the second network device and to which the terminal device is allowed to perform AI handover.

13. The apparatus according to claim 11, wherein, when executed, the instructions cause the apparatus to further perform operations comprising:
obtaining user plane data of the terminal device from the first network device; and
obtaining a first status transfer message of the first network device, wherein the first status transfer message indicates a number of a first downlink service data unit (SDU) in the user plane data transferred by the first network device to the second network device, or a number of an SDU that can be discarded in the transferred user plane data.

* * * * *